US008251397B2

(12) United States Patent
Tabe

(10) Patent No.: US 8,251,397 B2
(45) Date of Patent: Aug. 28, 2012

(54) ADVANCED WEIGHT RESPONSIVE SUPPLEMENTAL RESTRAINT COMPUTER SYSTEM

(76) Inventor: Joseph Akwo Tabe, Silver Spring, MD (US)

( * ) Notice: Subject to any disclaimer, the term of this patent is extended or adjusted under 35 U.S.C. 154(b) by 943 days.

(21) Appl. No.: 11/585,274

(22) Filed: Oct. 24, 2006

(65) Prior Publication Data
US 2007/0083311 A1 Apr. 12, 2007

Related U.S. Application Data

(63) Continuation-in-part of application No. 10/680,826, filed on Oct. 7, 2003.

(51) Int. Cl.
B60R 21/16 (2006.01)
B60R 21/26 (2011.01)

(52) U.S. Cl. .................. 280/735; 280/728.1
(58) Field of Classification Search ............ 280/735
See application file for complete search history.

(56) References Cited

U.S. PATENT DOCUMENTS

| | | | | | |
|---|---|---|---|---|---|
| 3,861,710 | A | * | 1/1975 | Okubo | 280/735 |
| 4,500,114 | A | * | 2/1985 | Grey, Jr. | 280/742 |
| 5,232,243 | A | * | 8/1993 | Blackburn et al. | 280/732 |
| 5,413,378 | A | * | 5/1995 | Steffens et al. | 280/735 |
| 5,707,078 | A | * | 1/1998 | Swanberg et al. | 280/739 |
| 5,785,347 | A | * | 7/1998 | Adolph et al. | 280/735 |
| 5,826,216 | A | * | 10/1998 | Lyons et al. | 702/143 |
| 6,039,344 | A | * | 3/2000 | Mehney et al. | 280/735 |
| 6,069,325 | A | * | 5/2000 | Aoki | 177/136 |
| 6,092,838 | A | * | 7/2000 | Walker | 280/735 |
| 6,161,439 | A | * | 12/2000 | Stanley | 73/862.391 |
| 6,231,076 | B1 | * | 5/2001 | Blakesley et al. | 280/735 |
| 6,260,877 | B1 | * | 7/2001 | Rasmussen, Sr. | 280/729 |
| 6,260,879 | B1 | * | 7/2001 | Stanley | 280/735 |
| 6,324,453 | B1 | * | 11/2001 | Breed et al. | 701/45 |
| 6,364,352 | B1 | * | 4/2002 | Norton | 280/735 |
| 6,397,688 | B1 | * | 6/2002 | Sakamoto et al. | 73/862.637 |
| 7,426,429 | B2 | * | 9/2008 | Tabe | 701/45 |
| 2001/0011481 | A1 | * | 8/2001 | Nonnenmacher et al. | 73/862.044 |
| 2001/0052939 | A1 | * | 12/2001 | Riedel | 348/294 |
| 2004/0135354 | A1 | * | 7/2004 | Kishimoto et al. | 280/735 |
| 2004/0145165 | A1 | * | 7/2004 | Nagai et al. | 280/735 |
| 2005/0230946 | A1 | * | 10/2005 | Takashima | 280/735 |

OTHER PUBLICATIONS

Wensink, Henk et al., First Micromachined Silicon Load Cell for Loads up to 1000 kg, 1997, MESA Reserach Institute, University of Twente, pp. 1-7.*
Zweijze, Robert A. F., Low-cost piezoresistive silicon load cell independent of force distribution, 2000, J. Micromech. Microeng., http://iopscience.iop.org/09600-1317/10/2/317, pp. 2-5.*

* cited by examiner

Primary Examiner — Paul N Dickson
Assistant Examiner — Barry Gooden, Jr.
(74) Attorney, Agent, or Firm — Joseph Tabe

(57) ABSTRACT

An advanced restraint system for a vehicle comprises a weight-sensing unit mounted to one or more seats positioned between the seat mounting frame and the floor means of the vehicle for sensing the weight of a sitting occupant and classifying the occupant accordingly, a computerized system for calculating an operating weight value corresponding to classified weight value, and an airbag system comprising one or more airbags and a deployment unit configured to inflate the airbags with a deployment force acceleration proportionate to the operating weight value when a sufficient collision force is sensed above a predetermined collision force value by a collision sensor.

39 Claims, 7 Drawing Sheets

ADVANCED WEIGHT RESPONSIVE SUPPLEMENTAL RESTRAINT COMPUTER SYSTEM

This application is a Continuation-In-Part of application Ser. No. 10/680,826, filed in Oct. 7, 2003, which is associated with the History Chain of the following applications: application Ser. No. 09/959,502, filed on Oct. 18, 2001, application Ser. No. 09/959,503, filed in Oct. 18, 2001, now U.S. Pat. No. 7,426,429, application Ser. No. 09/692,098, filed Oct. 20, 2000, now U.S. Pat. No. 6,728,616, application Ser. No. 09/692,096, filed on Oct. 20, 2000, now abandoned, Provisional Application Ser. No. 60/052,435, filed Jul. 14, 1997, U.S. patent application Ser. No. 08/953,503 filed Oct. 17, 1997, U.S. Provisional Application Ser. No. 60/079,496 filed Mar. 26, 1998, World Intellectual Property Organization. This Application claims priority benefit from U.S. application Ser. No. 10/660,473, filed Sep. 12, 2003, now U.S. Pat. No. 7,271,720, which claims benefit from Provisional Application Ser. No. 60/426,800, filed Nov. 18, 2002. The improvement for the instant invention is based on the same concept as the provisional application Ser. No. 60/052,435, filed Jul. 14, 1997, provisional application Ser. No. 60/079,496 filed on 26 Mar. 1998 and of PCT Application No. PCT/US1999/006666, PCT/US19998/014184, PCT/US1999/009435. Priority benefits are claimed therewith, as south in their entirety.

FIELD OF THE INVENTION

Disclosed embodiment relates generally to occupant vehicle supplemental restraint systems commonly known as air bags. More specifically, embodiment provides to a supplemental restraint system which is sensitively operable for determining the weight of a vehicle seat occupant in response to the output signal of from the sitting occupant's applied weight on the surfaces of the seat and the floor of the vehicle for controlling the deployment force reaction of a safety restraint system which is sensitive to the calculated occupant weight.

Definitions

Strain gauge 11: Electrical resistance element exhibits a varying electrical resistance as it is deformed. A device affixed to at least a steel beam of a load cell 15 to measure the accurate weight of the occupant and responsive for transforming occupants weight into electrical energy.

Load cell 15: Machined high strength steel beams with at least one strain gauge 11 bonded to the surface of the machined high strength steel beam. A sensing device that houses electrical resistance elements responsive for transforming deformation in the load cell 15 caused by weight into electrical energy. The load cell is mounted between the mounting surface of the occupant's seat and the floor of the vehicle to form a detection platform for sensing the occupant's weight information.

Specialized arrays: Help manage the flow of data about a vehicle occupants and the vehicle's acceleration to a computer memory.

Microprocessors: A device that follows the instructions of a computer programmer to manage and direct the command flow of a system.

BACKGROUND OF THE INVENTION

The advantages of the supplemental restraint system, in occupant vehicles, in combination with the use of seat belts have been well appreciated. Air bags are among the most successful safety devices in motor vehicles today. The use of air bags in modern vehicles is fast becoming an absolute standard.

Recently, however, a problem has arisen which presents both real and perceived hazards in the use of air bags. Air bags are primarily designed for the benefit of adult occupants. When children or infants are placed in the front occupant seat, deployment of an air bag could cause, and has caused, serious injury. Automobile manufacturers, realizing this hazard, have recommended that children and infants only ride in the rear occupant seats of the automobile.

According to the National Highway Transportation Safety Board, "smart" technology air bags should be in place by automakers starting with the 1999 motor vehicles. In short, "smart technology" air bags adjust air bag deployment to accommodate the specific weight considerations of the occupant who would be affected by its deployment. The end result is that small occupants are not injured by the deployed air bag.

While air bags have been credited with saving thousands of lives, the tremendous force of the air bag deployment has proven that injuries often result from these expensive measures to promote safety. Air bags have been blamed for deaths of many children and adults in low-speed accidents that they otherwise would have survived.

Placing infants and small individuals in the front occupant seat of automobiles has led to some serious, but avoidable, tragedy. Unfortunately these accidents have had a secondary effect in that the public is beginning to perceive air bags as inherently dangerous and, therefore should be selectively disabled, if installed at all. In light of the statistics, air bags have provided a net life saving, thus the solution to the above problem should be less drastic than termination of same, in other to prevent them from injuring younger occupants.

Inevitably, children will be placed in the front occupant seat of automobiles, whether this is due to ignorance of the hazards, or simply due to the necessity of fitting a number of occupants in a particular vehicle. Therefore, the solution lies in adapting the supplemental restraint system to adjust the deployment force to compensate for the presence of smaller occupants. It should be noted that, while less likely, smaller adults also may be injured by the deployment of an air bag. The most obvious solution to the problem, and one, which the public seems to be demanding if air bags are to be used at all, is that the operator of the vehicle has the opinion of disabling the air bag. This solution has several problems. First, inevitably, the operator may forget to disable it when it should be. Second, the operator may forget to enable the system when desired for adult occupants. Finally, entirely disabling the system deprives children and smaller occupants of the benefits of air bags.

In order to avoid some of the above problems, related prior art devices have incorporated measurement systems into the seats of some vehicles to gather information about the occupant and to operate the air bag in accordance with that information. These systems generally represent a simple "on" or "off" selection. First, if an occupant is not located in the seat, or does not trigger certain secondary detectors, the restraint system is disabled. If the detector properly senses the occupant in the vehicle, the air bag is simply "enabled". These systems have no way of identifying a changing occupant and correcting the occupant's changing data.

This is exemplified by U.S. Pat. No. 3,861,710, to Okubo, issued Jan. 21, 1975, which shows an incremental airbag deployment through incremental signal communication, but does not show how occupants are classified to enable variable deployment of the airbag. U.S. Pat. No. 4,806,713, issued Feb. 21, 1989, to Krug et al., which shows a seat contact switch for generating a "seat occupied" signal when an individual is sensed atop a seat. The Krug et al. Device does not have the ability to measure the mass of the seated individual.

U.S. Pat. No. 5,071,160, issued Dec. 10, 1991, to White et al., provides the next iteration of this type of system. A weight sensor in the seat, in combination with movement detectors, determines if it is necessary to deploy an air bag. If an air bag is deployed, the weight sensor determines what level of protection is needed and a choice is made between deploying one or two canisters of propellant. First, the weight sensor is located in the seat itself, which inherently leads to inaccurate readings. Second, the level of response has only a handful of reaction levels, thus the occupant not corresponding to one of these levels may be injured due to improper correlation of deployment force used to inflate the air bag.

U.S. Pat. No. 5,161,820, issued Nov. 10, 1992, to Vollmer, describes a control unit for the intelligent triggering of the propellant charge for the air bag when a triggering event is detected. Vollmer's device provides a multiplicity of sensors located around the occupant seat so as to sense the presence or absence of a sitting, standing, or kneeling occupant. The Vollmer device is incapable of sensing varying masses of occupants and deploying the air bag with force corresponding to the specific occupant weight. Rather, the Vollmer seat and floor sensors ascertain whether a lightweight object, such as a suitcase, is present or a relatively heavier human being. None of the above inventions and patents, taken either singly or in combination, teaches or suggests the present invention.

U.S. Pat. No. 5,232,243, to Blackburn, et al, issued Aug. 3, 1993, uses a film with electrical characteristics with changeable state. Blackburn, et al apparatus teaches a system that sends signals indicative of occupant's presence, but would not classify the occupants to enable a deployment force that would not cause further injury to the occupant.

U.S. Pat. No. 5,330,226, to Gentry, et al., issued Jul. 19, 1994, teaches an apparatus for controlling actuation of occupant restraint system and includes displacement sensors on the dashboard and an infrared sensor on the headliner for sensing the location of the occupant. The invention of Gentry, et al. has no way of classifying changing occupants to enable variable force airbag deployment to protect occupants without causing any further injury to the occupants.

U.S. Pat. No. 5,413,378, to Steffens, Jr., et al, issued May 9, 1995, uses position sensors and weight sensors to sense occupants, but the deployment of the airbag is controlled by a controller selecting a discrete control zone to regulate a vent valve. Steffens, Jr., et al, fails to implement a system that is capable of sensing occupants actual weight measurement and set airbag deployment based on the data. Besides, the system of Steffens, Jr., at al, has no way of classifying changing occupants.

U.S. Pat. No. 5,707,078, to Swanberg, et al., issued Jan. 13, 1998, teaches airbag with adjustable cushion inflation, which includes a valve member in a module to change the size of the inflation outlet through which inflation fluid flows into the airbag cushion, but is not controlled by the occupant's weight. Thus, the invention of Swanberg, et al. fails to teach airbag assembly that is configured with a classification system to produce a device that would enable airbag deployment at a force that would not cause further injury to the occupant.

U.S. Pat. No. 6,259,167, to Norton, issued Jul. 10, 2001, still was filed only after the parent application of the current invention was made public, though failed in its entirety to show how occupants data could be monitored and corrected.

U.S. Pat. No. 6,407,347, to Blakesley, issued Jul. 18, 2002, though attempted to use strain gages after the parent application of the current invention was filed, still fails to distinguish a proper means by which occupants data could be monitored.

U.S. Pat. No. 6,677,538, to Cook, Jr. et al, though uses strain gages for a vehicle weight classification system, the approach of Cook, Jr., et al. is limited to using analog signal processing technique without revealing a proper means by which occupants weight could be monitored and the data properly control to keep the occupants from sustaining body injury during an accident. Besides, Cook, Jr., et. al., issued Jan. 13, 2004, This Application was filed only after the parent application of the current invention was made public, but still fails to show how occupants data could be corrected.

U.S. Pat. No. 6,609,054, to Michael, issued Aug. 19, 2003, teaches a classification system that classifies vehicle occupants based on data from an array of sensors and modules are used to for making airbag deployment force decision, airbag deployment direction, or whether not to deploy the airbag. The decisions by Michael teachings for enabling airbag deployment are insufficient in scope to properly deploy the airbag without causing any more injury to the occupants U.S. Pat. No. 6,695,344, to Constantin, issued Feb. 24, 2004, teaches an airbag module with a predefined outlet opening for the airbag. The module includes a reinforcement ring for the airbag. Constantin's teachings fail to show how the outlet opening is influenced by the occupants weight to enable a proportionate deployment force for the airbag.

U.S. Pat. No. 7,011,338, to Midorikawa, et al., issued Mar. 14, 2006, teaches a seatbelt device which prevents an occupant from hitting his face against an airbag during deployment by taking up seatbelt slack before a collision. However, tensioning the occupant prior to collision without a predetermined tensile force that is proportionate to the oocupant's weight will only cause further injury to the occupant at the time/before the occupant is met with the airbag.

U.S. Pat. No. 7,047,825, to Curtis, et al., issued May 23, 2006, teaches weight sensor assembly for measuring weight on a vehicle seat. The sensor assembly is mounted between the seat bottom frame and a seat mounting member. Though Coutis, et al., fails to use EPROM for monitoring and classifying changing occupants, their teachings seems to be a reflection of publication by World Intellectual Property Organization, Application Number WO 99/48729 and Patent Corporation Treaty, Application Number US99/06666 originally invented by applicant of the present invention.

SUMMARY OF THE INVENTION

Disclosed embodiment is operable to deploy an air bag intelligently through the use of weight sensors. There are two major points of concern relative to air bag deployment. First, the occupant's weight must be determined accurately. Second, once an accurate measure of the occupant's weight has been ascertained, air bag deployment must be controlled to apply an amount of force appropriate for protecting the occupant. Embodiment provides many unique advantages over prior arts devices, being operable to solve the long existing problems of the air bag deployment force. Some of the advantages are:

The initial weight of a seating occupant and a changing occupant exiting the vehicle is precisely monitored. A load cell underneath the seat senses the weight of an occupant at regular intervals. The load cell accurately determines occupant's weight. Thus, the weight of the occupant precisely controls the deployment force. A control module is dependent on the occupant's presence and the crash severity in other to decide which airbag, if any, should be deployed and precisely controls the deployment force of the airbag in response to the occupant's weight and the severity of the crash when an accident is sensed. Each sitting position is assigned to at least an address line. The Erasable Programmable Read Only Memory-EPROM controls the information about different occupants and at least a changing occupant at the address line. Thus, vibrations caused by bumps do not disturb occupant's weight information for the memory at the address line.

The address line, which is a referenced storage memory that stores the occupant's actual weight at the initial sitting, does not allow data changes due to vibration or occupant movement on the seat. Once the weight is referenced to the address line, it will be protected from shocks and vibrations, and also prevent data changes when the occupant is sensed to be moving while the vehicle is in motion. Even if the occupant's body moves while the vehicle is in motion, the EPROM will only replace the address line information when the occupant completely leaves the seat. Drivers can verify or check the airbag functionality by simply pushing in on the check button switch.

The occupant's weight information from the load cell, which is communicatively configured with the accelerometer, enables the airbag to deploy with a force that is dependent on the occupant's weight, while the activation of the collision sensor is dependent on the crash severity. The system's intelligence is unique and deployment is smart.

The accelerometer microprocessor is operatively configured with signal amplifier to enable amplified communication signals only when the collision sensor senses collision of a structurally preset magnitude. The collision sensor is activated only when a collision force capable of causing injuries is sensed. The deployment force is controlled by the occupant's weight. The deployment acceleration for the airbags is directly proportional to the weights of the occupants and variable deployment force is ascertained. The detection of rear end collision and timely deploying an airbag in response is also controlled by the system.

The software is programmed to communicate with the driver to further eliminate the usual uncalled behaviors of seating occupants on inappropriate sitting locations. For example, the system will communicate to the driver that a person in the front seat is too small to be safely seated if such a person is detected. Thus, the system is occupant friendly. The discharging of igniting gas and the gas igniter are controlled by the weight information of the occupant on the seat to ensuring a more secured and less destructive deployment force for adults and children of varying ages and sizes. Accordingly, embodiment provides controlled air bag deployment with regard to the mass of the occupant. A load yell underneath at least an occupant seat senses the weight of an occupant at regular intervals. The load cell accurately determines occupant weight, as opposed to seat sensors embedded within the seat cushion which provide "occupant present" signal. Disclosed embodiment provides a mechanism for providing controlled air bag deployment based on the mass of the occupant. In this regard, the mechanism variably controls the amount of gas into a combustion chamber, which propels the air bag. The air bag can deploy with as little or as much force as is appropriate based upon the occupant's weight.

Disclosed embodiments provide methods to improve on the calculated speed of the air bag reaction in response to the occupant's weight value and the speed of the vehicle when the vehicle is involve in a collision of a prescribed magnitude. In addition, this improvement includes transistorized switches and other elements like chips and processors.

Embodiment includes the known standard configuration for all types of air bags. Certain embodiments provide methods to variably control the deployment force on frontal air bags, ceiling air bags, side door air bags and rear seating air bags with the initial control energy from the load cell. Disclosed embodiments further provide erasable memory chips that are lodged safe and secured inside hard plastic or ceramic shells that are easy to handle and assemble into legions of digital devices to monitor the changing occupant's weight information. In parts, a chip motherboard is used, which is configured with a machined microprocessor nerve center, where all activities of the occupants and the like are sent for processing. All the chips are protected within some rectangular slabs or modules.

The module varies conspicuously in external dimensions and in number of contact points with copper paths, including a wiring harness that conduct large data and power throughout the circuit board with a minimum of control energy. Though different types of control module may be employed in disclosed embodiments, only the thyristor will be mentioned in detail. The thyristor, which is a silicon-controlled rectifier, can be turned on at any point in the data computing cycle. Accordingly, a current pulse is applied to the gate to start the conduction process once the load cell senses an occupant. Once the conduction is started, the pulse is no longer necessary and the silicon controlled rectifier then remain in conduction until the current goes to "0", which is an indication that there is no occupant on the seat.

In all, the silicon controlled rectifier is so important in the application of disclosed embodiments because of its fast switching speed needed to keep the microprocessors informed about the occupant's presence and the severity of the crash to initiate the initial deployment of the air bag. Intelligently, the silicon controlled rectifier works very closely with the computer logic circuit board. The computer microprocessors reside inside a long narrow slab and mounted behind the socket that accepts information from the load cell data output. That is, the presence of the occupant sends an input signal to the load cell. The weight of the occupant is output from the load cell to the control module. The control module, which is a silicon-controlled rectifier that is used as gate arrays, helps in managing the flow of data from the load cell to the central processing unit "CPU". Small chip modules are scattered about the computer to help ease communication between the board's main functions. The main memory of this computer device is mounted in the motherboard. This memory is always recognized as parallel ranks of identical modules.

Another type of chip used in this device is the EPROM "erasable programmable read only memory". This chip holds information fundamental to the operation of disclosed embodiments. The information or data about a changing occupant is controlled by the EPROM, which is configured with an address line. The EPROM is communicatively connected the CPU and contains the operating software. The chip module connectors or pins are plug into sockets soldered to the motherboard. The EPROM Sockets are pressed into a hole in the board before soldering and communicatively configured with the load cell. When an occupant takes the seat, this chip will send all the output information about the occupant to the address line to initiate the operation of the software. The chip module is made of wires that are as fine as silk arch, gracefully forwarded from the ends of the pins to square contact pads that line the periphery of the EPROM.

These wires are fused by heat to the pins and contact pads, which are connected through microscopic amplifier circuits, to the rows and columns of the memory cells that cover the chip. The amplifier is designed to amplify the entire device for more speedy output to the accelerometer. There are empty pads between the wires that are used for testing the chip, reprogramming, or as spares in the event that a pad proves faulty. The chip module is tightly sealed against the entry of moistures and other contaminants. Contaminants could corrode the delicate wires and interrupt the flow of electrical signals from the chip to the pins. Thus, sealing the chip module enables protection against moisture and also protects against contaminant.

Another element used to calculate the occupant's mass, or any calculation necessary for the safe deployment of the air bag is the Central Processing Unit "CPU". The CPU is the brain, the messenger, and the boss of the microprocessor for disclosed embodiments. The Random Access Memory "RAM" will take load cell data about the occupant from the address line and turn over to this central processing unit to manipulate. The central processing unit will then use this information to calculate the occupant's mass and any other relevant information unique for the accelerometer microprocessor. That is, this processor will use the information from the CPU to enable adjustment on the accelerometer crystals to generate control energy for the speed and acceleration of the air bag. This speed and acceleration is proportionate to the load cell output weight value of the occupant and the occupant's calculated mass responsive for the safe and proper deployment of the air bag. The same information from the CPU is then used by the canister microprocessor to adjust the gas canister sliding pot and the gas release valve relay to release a proportionate amount of igniting gas from the canister into the igniting gas chamber combustion.

The released amount of igniting gas, when ignited by the gas igniter, will enable combustion and deploy the air bag at a speed and force that are proportional to the occupant's weight, without causing any further injury. There are other processors that are inside this computer that handles the signals coming from the CPU to the accelerometer to duplicate the same effect and compare with the accelerometer microprocessor before the deployment is initiated upon collision. These processors are configured to locate the occupant's weight information, process the information quickly in less than a millisecond, and signal the accelerometer to communicate a control energy that will determine the exact acceleration output needed to influence deployment of the air bag when the collision sensor senses a collision of a prescribed magnitude. All the operations of the processors are done by signals, turning on or off different combination of the transistorized switches. The processors are configured to handle the arithmetic logic unit that handles all the data manipulations.

The processors are configured with the sensors and communicatively connected to the RAM through the computer device motherboard or bus. The bus interface unit is operatively configured to receive data and coded instructions from the computer RAM. Data travels into the processor 10 bits at a time. The branch prediction unit communicatively configured to inspect the instructions to decide on the logic unit. The decoder is communicatively connected to the branch prediction unit to then translate the response from the load cell into the instructions that the Arithmetic Logic Unit can handle. If decimal point numbers exist, the internal processor will kick in to handle the numbers. The Arithmetic Logic Unit "ALU" will receive instructions up to 10 bits at a time. The ALU is configured to process all its data from the electronic scratch pad or register. All results are made final at the RAM. The module links are made of gold to resist corrosion from dampness that might enter the module, despite precautions.

When the key switch of the vehicle is turn on, a burst of electricity of about 5 millivolt will energize the load cell. When an occupant takes on the seat, the load cell will use the input energy from the occupant's body to start strings of events that will be sent to the computer device memory for processing and calculations. This input from the occupant's body will be received by the load cell as force energy. The load cell will then output the force energy as weight and send to the control module to identify the seat that has the occupant. When there is no occupant on the seat, the control module will further check to make sure that there is no person on the seat. That is, the control module will recognize the weight of the seat and the 5 millivolt.

Any additional weight will cause the control module to send immediate signal to the CPU to calculate the mass. The control module will then signal other processors responsive to program the computer device to transmit signals for the proper air bag deployment force and speed. Always, the CPU will first check for the program functions and workable parts. If the CPU finds any unworkable part, it will send a human voice audio message out to let the driver know of the problem before hand. That is, the air bag will not deploy until repairs are made to safe guard the occupants. The deployment of the air bag when an unworkable path is found may further cause injuries to the occupant. However, there is a periodic functional check button for the air bag that is installed on the driver's side of the dashboard. When the driver starts the car, before he drives away or engage the vehicle in motion, he can always use this check button to check and make sure that all the air bags and their components are workable. The test results will be accomplished with an audio broadcasting human voice signals for the specific test performed to enable a result read out.

When the CPU complete it's test, it will receive a program from the application software that will tell the CPU how to carry on the tasks faster and more accurately. The CPU is of a tabula Rasa, which can make it capable of handling any task in the air bag control environment. The microscopic transistorized switches in the heart of the microchips would enable the CPU transform the force energy coming from the occupant's body as input to the load cell faster, which is then output to the control module as weight. The weight value is then transmitted to the accelerometer processor configured with the accelerometer for energizing the crystals to generate a proportionate amount of energy.

The accelerometer mass, which is dependant on the said energy generated by the crystal, will travel to a distance D. The energy generated by the crystal is equal to the force needed to move the mass body to the distance D. The distance D, which the mass traveled, is equal to the distance contracted by the accelerometer spring and proportional to the occupant's weight. That is, the weight of the occupant, the energy generated by the crystal, the force acting on the accelerometer mass, and the contracting force acting on the spring are all proportionate, while the distance D that the mass traveled to is proportionate to the distance contracted by the spring.

The accelerometer crystal is responsive for generating the electrical energy that will influence the contraction of the accelerometer spring to determine the deployment force and acceleration for the air bag. The weight value from the load cell is the same weight value that, when processed, will be used to energize the air bag canister sliding pot and gas release valve to adjust to the to the amount of gas which, when ignited, will influence the rate of deployment that is proportional to the said weight value of the occupant. The force energy created by the ignition of the gas inside the combustion chamber is proportionate to the force responsive for contracting the accelerometer spring. The energy generated by the combustion of the igniting gas also determines the deployment force of the air bag. This intelligent device, with all the microscopic transistorized switches, will constantly be flipping on and off in time to a dashing surge of electricity.

In addition, the operating system will take on more complicated tasks when the ignition switch is turn on. This includes making the hardware interact with the software to make sure that all the memories are workable. The boot manager will assume control of the start up process and loads the operating system into ROM. The operating system chip works with the BIOS to manage all operations, execute all programs, and respond to all signals from the hardware. Lots of transistors are used in this device to create binary information responsive for logical thinking inside the computer. If the current passes, the transistor will create a"1" and the system will run through a post. If there is no current, the transistor will create a" 0". The 1s and 0s are the bits used as on off switches through out the logic. This computer device will be able to create any number to match the occupant's weight, provided it has enough transistors grouped together to hold the 1s and 0s required. The computer is a 10-bits computer. That means it will handle binary numbers of up to 10 places or bits to make it faster.

The bits will stand for true 1 or not true (0), which will allow the computer to deal with Boolean logic. The transistors will be configured in various ways or logic that is combined into arrays called half adders and full adders. Most transistors are needed to create the adder that can handle the mathematical operations for up to 10 bit numbers as required by design. These transistors will it possible for a small amount of electrical current to control a much stronger current in a millisecond. The transistors will also be able to control a more powerful energy through the load cell to the accelerometer in a millisecond during collision. Thousands of transistors are combined on a single slice of silicon. A small positive electrical charge of 5 milivolts is sent down through an aluminum lead that runs into the transistors. This charge will be transferred to a layer of conductive polysilicon buried in the middle of a non-conductive silicon dioxide. The positive charge will then attract negative charge electrons out of the base of the positive silicon that separates two layers of the negative silicon. The electrons will rush out of the positive silicon, creating an electronic vacuum filled by electrons rushing from another conductive lead called the source.

The electrons from the source will flow to a similar conductive lead called the drain in addition to filling the vacuum in the positive silicon, there by completing the circuit. This completion of the circuit will turn a transistor on so that it will represent a 1 bit. If a negative charge is applied to the polysilicon, electrons from the source will be applied and the transistor will turn off. The transistors used for this device are combined on a single slice of silicon. The slice is embedded in a piece of plastic and attached to metal leads that expand to a size that makes it possible to connect the chip to other parts of a computer circuit. The leads carry signals into the chip and send signals from the chip to other computer components.

When the key switch is turn on, an electrical signal of 5 milivolt will energize the load cell before it gets to the computer. When it gets to the computer, it will follow a permanently programmed path to the CPU to clear left over data about the previous occupant from the chips internal memory registrar. This electrical signal will reset the CPU register called program counter to a specific number. This number will tell the CPU the address of the next instruction that needs processing. The measured weight of the occupant is read by the load cell, the weight is then transformed from analog to digital before it is sent to the address line in a set of read only memory chip that contains this computer device basic input and output system "BIOS".

As the key switch is turned on, the post will check all the hardware components' functionality. The boot program on this computer device having a ROM and BIOS chip will check to see if there is any occupant on any of the seats. The program will then send the occupant's information on weight to the address. If there is no person on any of the seat, the program will check any additional weight. If the weight is less than 10 lb, the program may send undeployment message to the address. The boot program, by checking for occupant's presence from the load cell to the RAM, will read all the information about the changing occupant's weight. The information about the changing occupant will constitute the occupant's new deployment force and speed of the air bags. That is, the occupant's weight will energize enough code that will activate the calculation of the occupant's mass, speed of the airbag, and deployment force that depend on this controlled energy. After all the calculations are done, the results will then be recorded into the memory at the tri-decimal address 3C00. The basic input output system will then pass the controlled information to the boot by branching to this address.

When an occupant is on the seat, the load cell will energize the operating system. The operating system will then send a burst of electricity along an address line that will represent the occupant's weight. The address line is a microscopic strand of electrically conductive material etched onto the RAM chip. The burst identifies where to record data among the address lines in the RAM chip. At each memory location where data can be stored, the electrical pulse will close a transistor that connects to a data line. These transistors, like all the other transistors, are microscopic electrical switches. When the transistors are closed, the load cell will send burst of electricity along selected data lines.

Whereby each burst will represent either a 1 or a 0 bit. When the electrical pulse reaches an address line where the transistor is closed, the pulse will flow through the closed transistor and charges the capacitor. The capacitor, which is an electronic device that stores electricity, will then let the process restarts to refresh the data with the exact value of the occupant's weight. When the occupant leaves the seat and all the other seats empty, the computer will then turn off the process. Each charged capacitor represents a 1 bit, while the uncharged capacitor represents a 0 bit.

The device also utilizes a post, which is a self-test that ensures that the hardware components and the CPU are functioning properly before any information is process and sent to the address. The CPU uses the address to find and invoke the read only memory that will get all the information about the occupants from the load cell and send to the basic input and output system program. The CPU will send all these signals over the system bus, to make sure that they are all functioning properly. In addition, the CPU will also check the system's tinier to make sure that all the operational functions are synchronized. The CPU will write data to each chip then read it and compare what it reads with the data it sent to the chip at first. A running account of the memory information is sent to the accelerometer processor that will enable communication with the crystals for the accelerometer to set to the desired acceleration that is dependant on the occupant's weight information. The accelerometer input will then be used to control the energy responsive for initiating a variable deployment force of the air bag. The post will send signals over specific paths on the bus to the load cell and check for the weight signal or response to determine the occupant's actual weight. The results of the post reading will always be compared with in the CMOS.

CMOS is the memory chip that retains its data when an occupant is replaced. The operating system lets this computer device read different signals from the load cells. The microchip contains the operating system that lets this computer device perform all assigned tasks by running the operating system for an alternative function.

The software will read data stored in the RAM through another electrical pulse sent to the address line, closing the transistors connected to it. Every where along the address line that there is a capacitor holding a charge, the capacitor will discharge through the circuit created by the closed transistors, there by sending electrical pulses along the data lines. The RAM chips are so important in this device because the computer will move the processed information about the occupant's weight from the address to the RAM. All the information and data are stored in RAM before the processor can manipulate the data. All data in the computer exist as 0s and 1s. An open switch represents a 0, while a closed switch represents a 1. When the key switch is turned on, RAM is a blank slate. The memory is filled with 0s and 1s that are read from the load cell to the address. When there is no occupant on the seat, every data in RAM will disappear.

The software will recognize which data lines the pulses are coming from, and interprets each pulse as a 1. Any line on which a pulse is not sent is represented as a 0. The combination of 1s and 0s from eight data lines will form a byte of data. The RAM functions as a collection of signals from transistorized switches responsive for enabling the control room of this device intelligence. The 1s and 0s, which is an on and off switch, are used to control displays, and can also be used to add numbers by representing the "0s" and the "1s" in the binary number system. This binary number system will allow the computer to do any other form of math. Everything in the computer, math, words, numbers and software instructions will communicate in the binary numbers. That means all the transistorized switches can do all types of manipulation.

The clock inside the computer regulates how fast the computer should work, or how fast the transistorized switches should open or close. The faster the clock ticks or emits pulses, the faster the computer will work. The speed is measured in gigahertz, which are some billions of ticks per second. Current passing through one transistor may be used to control another transistor; in effect turning the switch on and off to change what the second transistor represents as a logic gate.

Accordingly, it is a principal object of disclosed embodiment to provide a supplemental restraint system having an accurate weight sensor to determine the presence and weight of the occupant.

It is another object of disclosed embodiment to provide a correlation between the weight of the occupant and the deployment characteristics of the air bag.

It is a further object of disclosed embodiment to provide an air bag deployment system, which is infinitely variable between an upper and lower threshold, to positively correlate the force of the air bag to the force of a moving occupant.

Still another object of disclosed embodiment is to prevent the deployment of an air bag when no occupant is present.

Yet another object of disclosed embodiment is to provide a mechanism to detect the imminence of a rear impact and to timely deploy an air bag in response thereto.

It is an object of disclosed embodiment to provide improved elements and arrangements thereof in a system for the purposes described which is inexpensive, dependable and fully effective in accomplishing its intended purposes.

These and other objects of disclosed embodiment would become apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Disclosed embodiments provide a mechanism for providing controlled air bag deployment based on the weight or mass of the vehicle occupant. In this regard, the mechanism variably controls the amount of gas in a combustion chamber, which propels the airbag. The air bag can deploy with as little or as much force as is appropriate based upon the occupant's weight.

Figure 1:
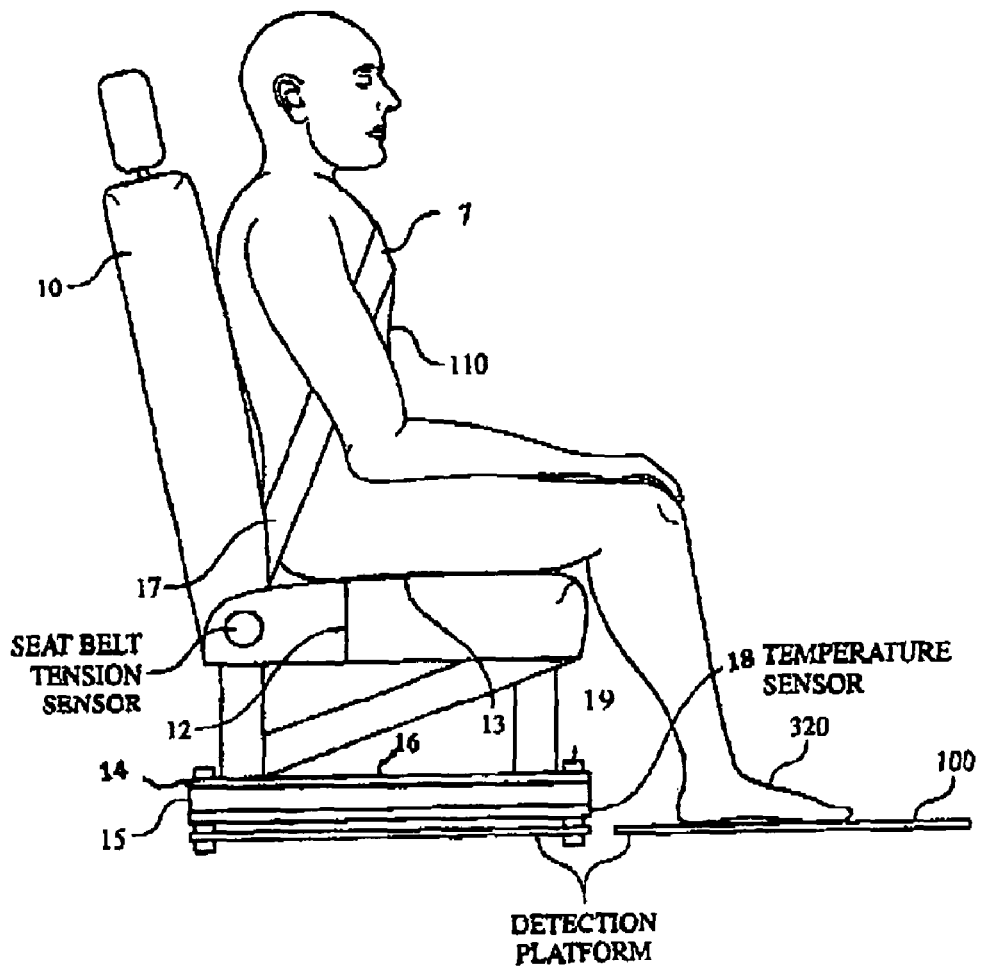
FIG. 1 is seen to represent an exemplary embodiment of a side view of a vehicle occupant 110 on a seat 10 having load cells 15 configured with a temperature sensor and mounted between the seat mounting surface and the floor of the vehicle to enable detection of the occupant to control deployment of the supplemental restraint system of the present invention.

Referring to FIG. 1, embodiments provide a seat 10, being disposed with load cell 15, comprising silicon substrate 14. Strain gauge 11, and human body temperature sensor 18 are embedded in the silicon substrate, and securely mounted between the seat mounting frame 16 and the vehicle floor 100, providing a detection platform. The load cell is secured firmly between the seat mounting structure and the floor with fasteners 19. Disclosed embodiments provide the detection platform being operable for detecting the weight of an occupant 110 on the seat 10 and the weight of the occupant 110 on the floor 100 of the vehicle. Certain embodiments provide the occupant 110, being seated on the seat contact surface 13, and being protected from the mounting frame 16 by a seat cushion 12. The occupant 110 is seated on the seat 10 and the occupant's leg 320 is being positioned on the floor 100. The temperature sensor 18 being operable for confirming the object being detected, and the detection platform operable to measure the actual weight of the occupant 110. Embodiments further provide the occupant 110 wearing a seatbelt 17. Some embodiments provide sensors 7, being embedded in the seatbelt 17, being further configured with seatbelt tension sensor.

Figure 2:
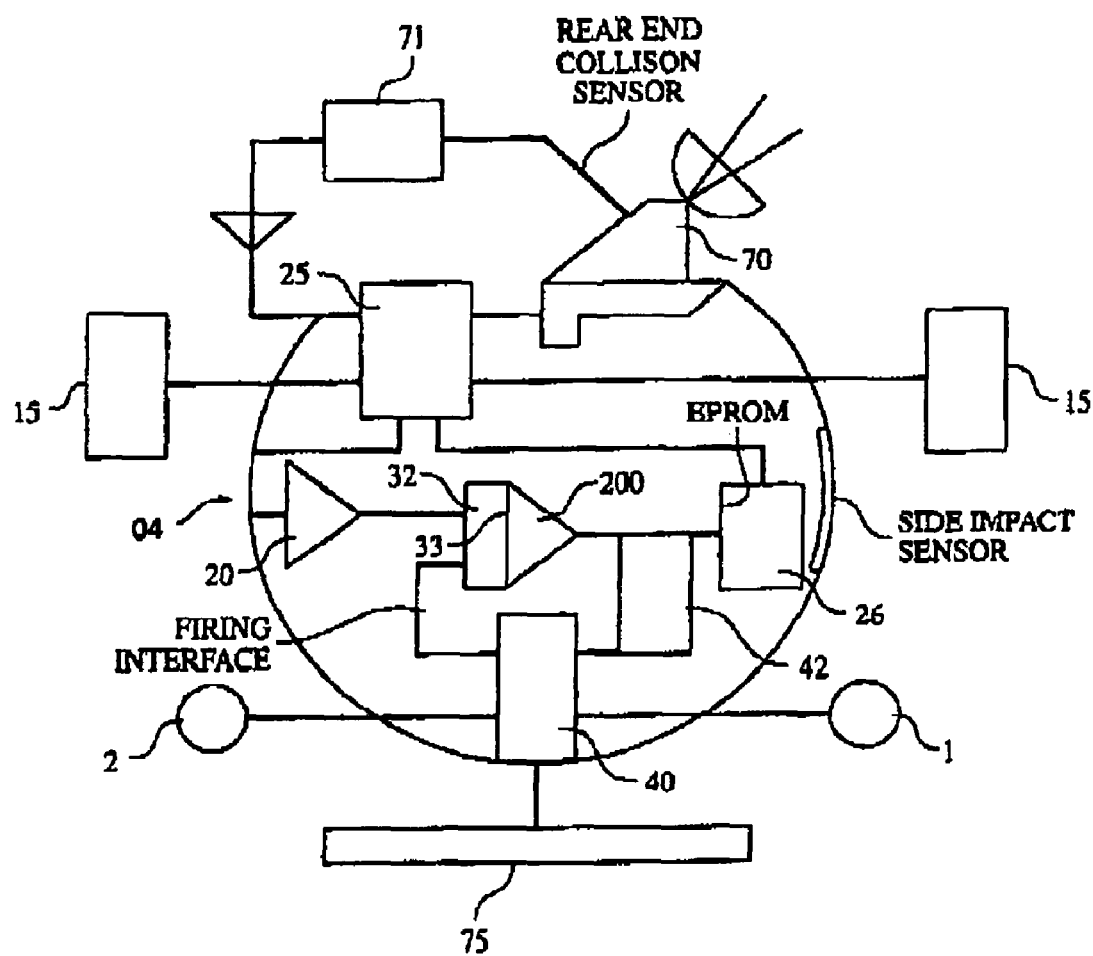
FIG. 2 is seen to represent an exemplary embodiment of the transistorized switches (04) and a block diagram of the primary components of the supplemental restraint system of the present invention.

Referring to FIG. 2, embodiments provide a transient voltage suppressor 200, in communication with the address line 33. The load cell 15 is communicatively connected to a control module 25 being operable to discriminate between humanly occupied seats and unoccupied seats. The accelerometer 40 is operatively configured with an amplifier 20 operable to amplify signal communications. Collision sensor 75 is operable to detect imminent frontal collision. Radar unit 70 is operatively configured with radar receiver being operable to detect imminent rear end collision. Embodiments provide a CPU 26 in communication with the accelerometer 40, being operable with the igniting gas release valve relay 42. The CPU 26 being further communicatively connected to the RAM 32, in communication with the EPROM 34. Embodiments provide a firing interface in communication with at least one of: the side impact sensor being operable with side airbag, airbag device 1, 2 being further responsive to signal from collision sensor 75. The amplifier 20 is communicatively connected to transistorized switches 04.

Figure 3:
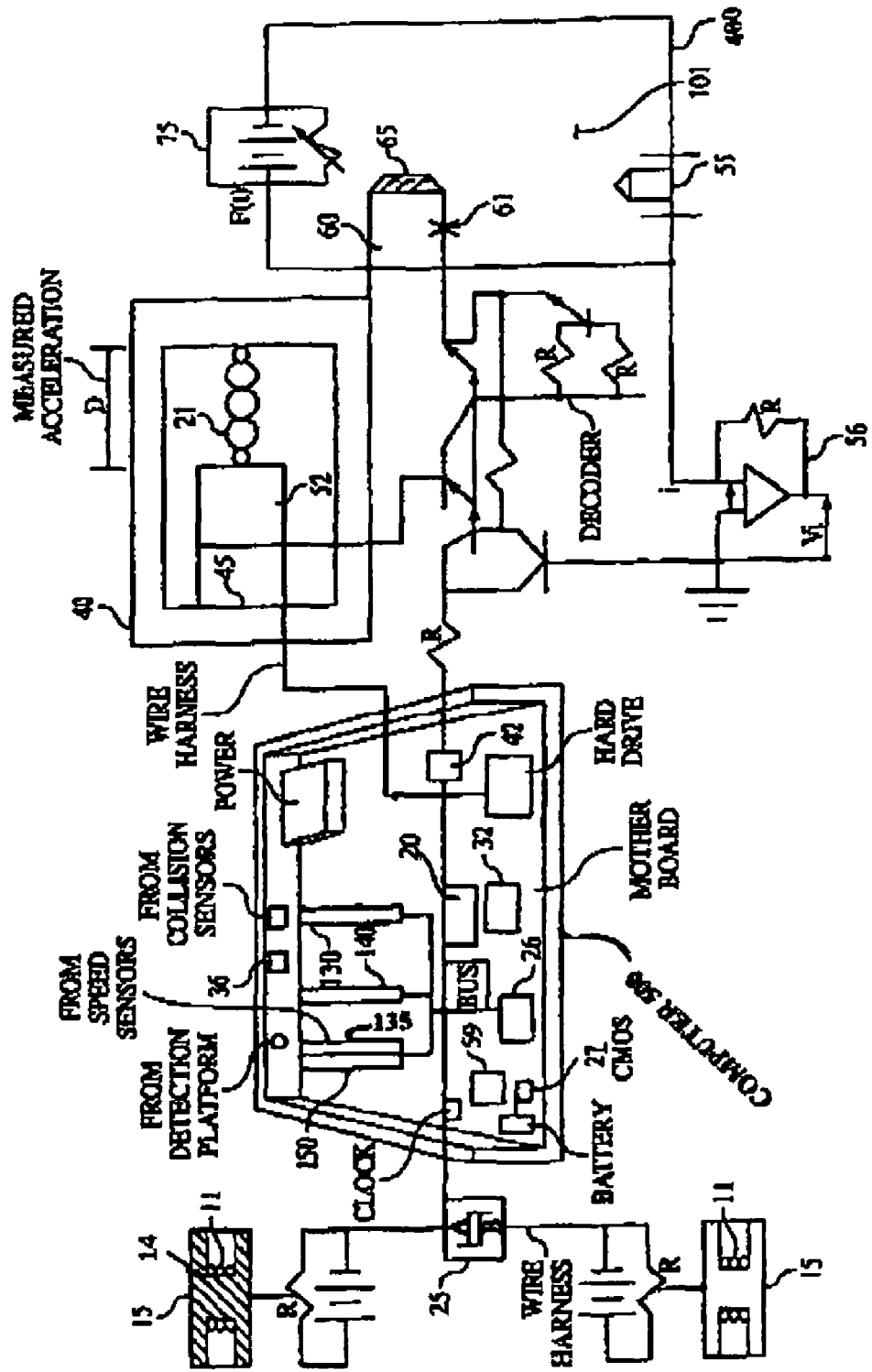
FIG. 3 is seen to represent an exemplary embodiment of a sectional view of the load cell 15 showing the strain gages 11, and a sensor circuitry representing a detection platform, circuit diagram for the components of the present invention are shown in the figure.

Referring to FIG. 3, embodiments provide pressure sensing device comprising a load cell 15 operatively configured with strain gauge 11. The strain gauge 11 being embedded in a silicon substrate 14 and disposed with the seat. The load cell 15 is operable with initial power source R, in communication with the control module 25, via a wire harness. Certain embodiments provide the control module 25 in communication with a computer apparatus 500. The computer apparatus 500 being responsive to signals from at least one of: a detection platform, a speed sensor, and a collision sensor. The computer apparatus further configured with a clock, a battery and/or power source, a mother board, CMOS, and a hard drive. Certain embodiments provide the post 36 being communicatively connected to the hardware in communication with the mother board 38. Some embodiments provide the computer apparatus 500 being operatively configured with at least one of: a seatbelt processor 140, an accelerometer processor 150, a collision sensor processor 135, and a gas canister processor 130. Embodiments further provide the computer apparatus 500 further comprising at lease one of RAM 32, CPU 26, BUS, signal amplifier 20, gas release valve relay 42, and ROM 59. Certain embodiments provide the computer apparatus 500 in communication with the accelerometer via a wire harness. The accelerometer comprises a spring 21, responsive to motion by a mass 52, in communication with crystal 45. The distance traveled by the spring 21, is the measured acceleration D. Signal from the load cell is further communicated to a decoder, in communication with the airbag assembly 400. The airbag assembly comprises a voltage to current transformer 56, a gas canister 60, a sliding pot 61, a gas igniter 55, a combustion chamber 101, and controlled gas 65. Certain embodiments provide signal from the collision sensor 75 in communication with the airbag assembly 400, being operable for the ignition of the controlled gas 65. Embodiment further provide the accelerometer 40 comprising at least one piezoelectric crystal 45 each being operatively connected to at least a mass 52. The mass 52 being communicatively connected to at least a spring 21 responsive to the energy being generated by said piezoelectric crystal in communication with the sliding pot. The sliding pot being operable to allow igniting gas 65 into the combustion chamber 101.

Figure 4:
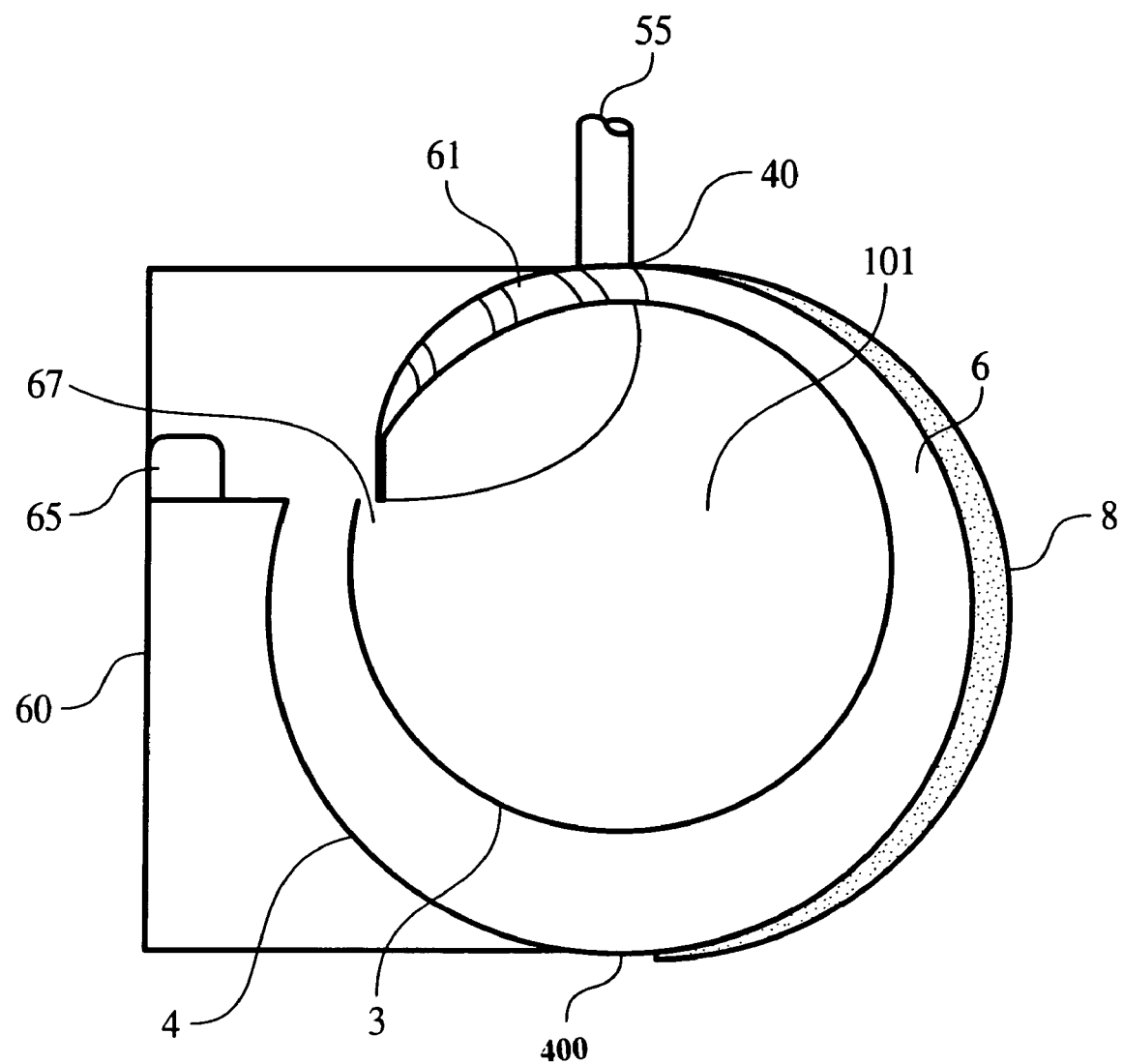
FIG. 4 shows an exemplary embodiment of the gas canister 60, the sliding pot 61, the external layer (4), the internal layer (3), the opening 67 for the release of controlled release gas 65, the air bag 1, the air bag sensor (8) and the combustion chamber (101) all forming the deployment components of the present invention.

Referring to FIG. 4, embodiments provide airbag device 400, comprising accelerometer 40, gas canister 60, sliding pot 61, igniter 55, combustion chamber 101, and airbag sensor 8. Certain embodiments provide dual airbag comprising inner layer 3, and outer layer 4, whereby upon deployment, there exists a gap 6 there between for extra cushioning to protect against deployment force severity. Some embodiments provide at least one corresponding airbag sensor 8 disposed on the airbag device comprising at least an airbag 4 being configured with at least one gas canister 60 being operable with said computer apparatus 500. The airbag sensor 8 is operable with the seatbelt sensor 7 of FIG. 1, communicatively configured to direct deployment of the airbag 1, 2 away from the occupant's head. Disclosed embodiment further provide the gas canister 60 being communicatively connected to the gas release valve relay 42 of FIG. 3, being operable for releasing igniting gas 65 into the combustion chamber 101 for ignition by the gas igniter 55. Certain embodiments provide the sliding pot 61 being responsive to signal from at least one of: the computer apparatus 500, the accelerometer 40, and operable for providing an opening 67 for the expansion of igniting gas 65 into the combustion chamber 101 for at least one airbag device 400. The sliding pot opening 67 is proportionate to the volume of igniting gas being released into the combustion chamber 101, being operable for providing a proportionate deployment force and acceleration when the collision sensor 75 senses a collision has occurred of a severity requiring deployment of airbag 1, 2. Certain embodiment provide the computer apparatus 500 of FIG. 3, being responsive to the weight value and the collision severity, in communication with the airbag device 400 to rendered of sufficient tension to keep the occupant 110 of FIG. 1 on the seat 10, when a collision is sensed by the collision sensor 75 and 71, but is not rendered of sufficient tension to cause impact injury to the occupant 110.

Figure 5:
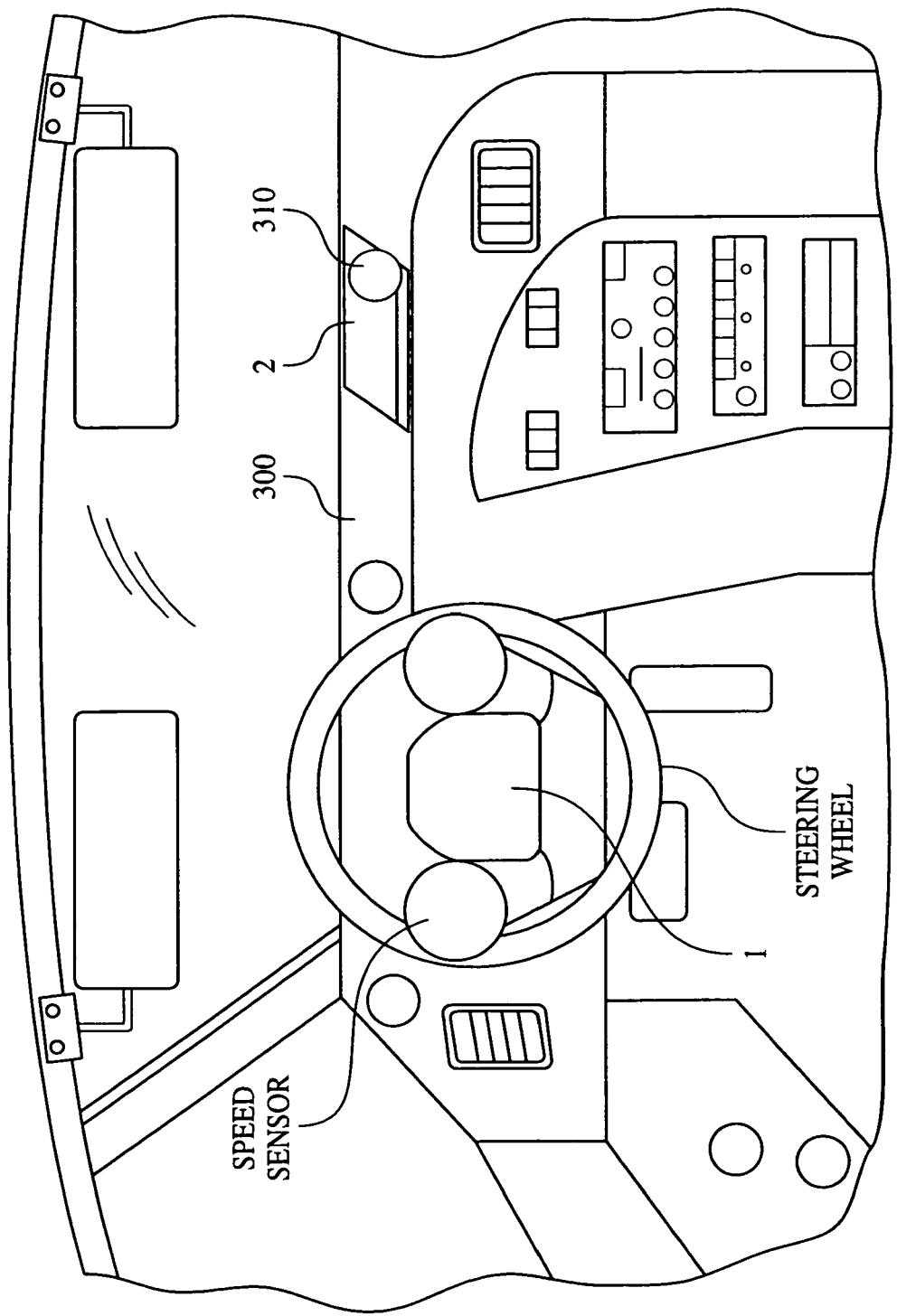
FIG. 5 is seen to represent an exemplary embodiment of the interior of the vehicle showing the airbags 1, 2, the dashboard 300, and the pressure sensor 310 mounted on the dashboard for enabling signal communication when active.

Referring to FIG. 5, embodiments provide the dashboard 300, being disposed with pressure sensor 310, airbag device 1, and airbag device 2. Airbag device 1 is disposed on the steering wheel operable for protecting the occupant 110 of FIG. 1, who may be the operator of a vehicle. Airbag device 2 is disposed on the dashboard 300 operable for protecting the occupant 110 of FIG. 1, who may be the passenger in a vehicle. The pressure sensor 310 is being operatively configured for sensing objects being disposed on the dashboard 300, such as the leg of a human body. Embodiments further provide the pressure sensor 310 in communication with the commuter apparatus to adjust the deployment strength of a restraint device in compensation to the detection.

Figure 6:
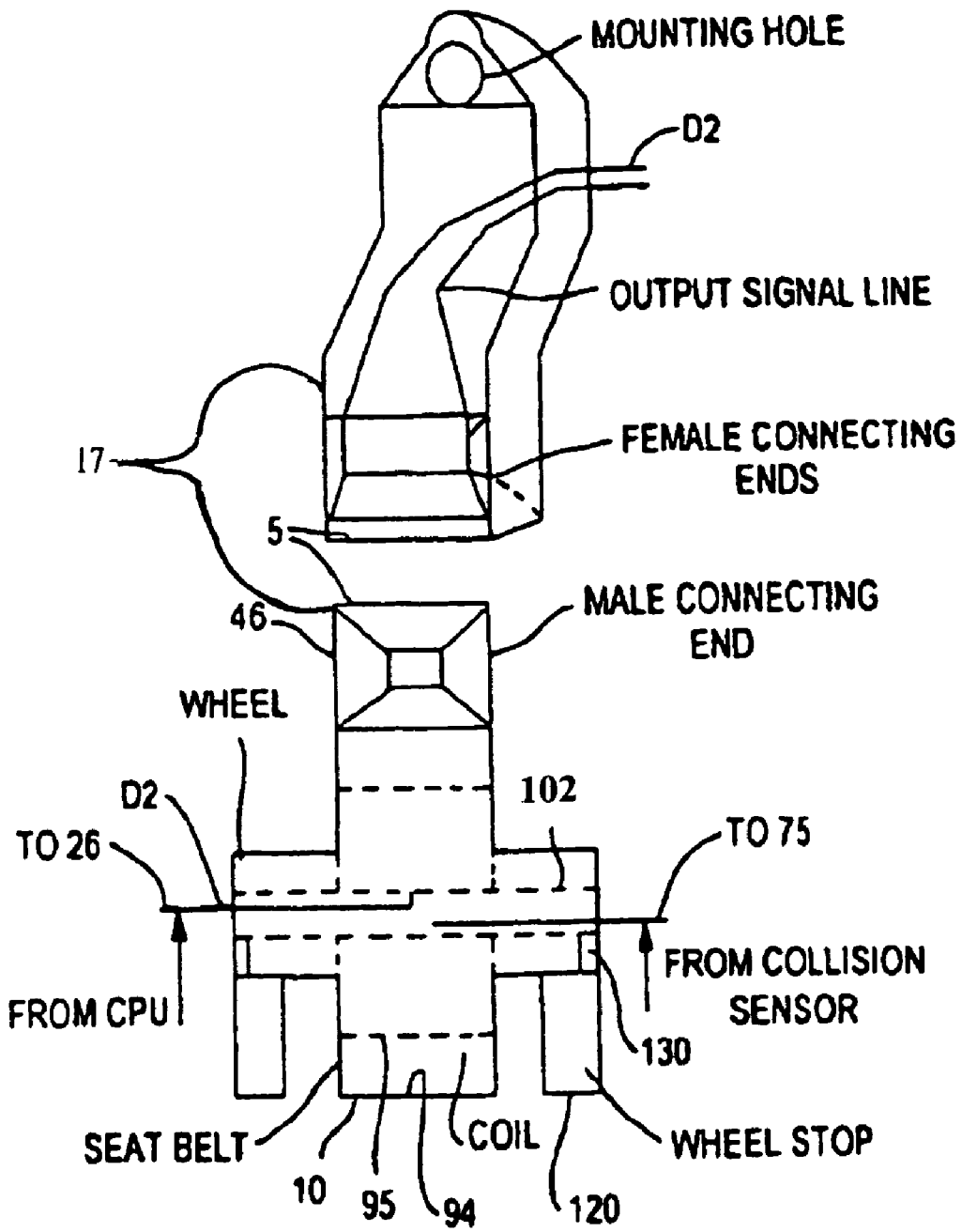
FIG. 6 is seen to represent an exemplary embodiment of a seatbelt device showing various inputs.

Referring to FIG. 6, embodiments further provide the restraint device comprising the seatbelt 17 being disposed on a seat 10. The restraint device comprises a housing comprising the seatbelt 17 being disposed on a shaft 94, male connecting end 46, female connecting end 5, output harness D2, a wheel 120, and wheel stopper plunger 130. Certain embodiments provide a coil 95 being mounted on the shaft 94 communicatively connected to the wheels 120. Some embodiments provide the coil 95 in communication with the collision sensor 75. The stopper plunger 130 is operable with the wheels 120. The stopper plunger 120 engages between the wheels 120 responsive to signal from the coil 95. The coil 95 is responsive to communication signal from the processor 140. Disclosed embodiments provide the restraint device being safely secured via a mounting hole. Certain embodiments provide the CPU 26 being responsive to signal from the collision sensor 75, in communication with coil 95, being operable with the motor 102. Other embodiments provide Seatbelt 17 being configured with the moveable coil 95 for tensioning occupant 110 per the rotation of wheel 120 based on weight.

Figure 7:
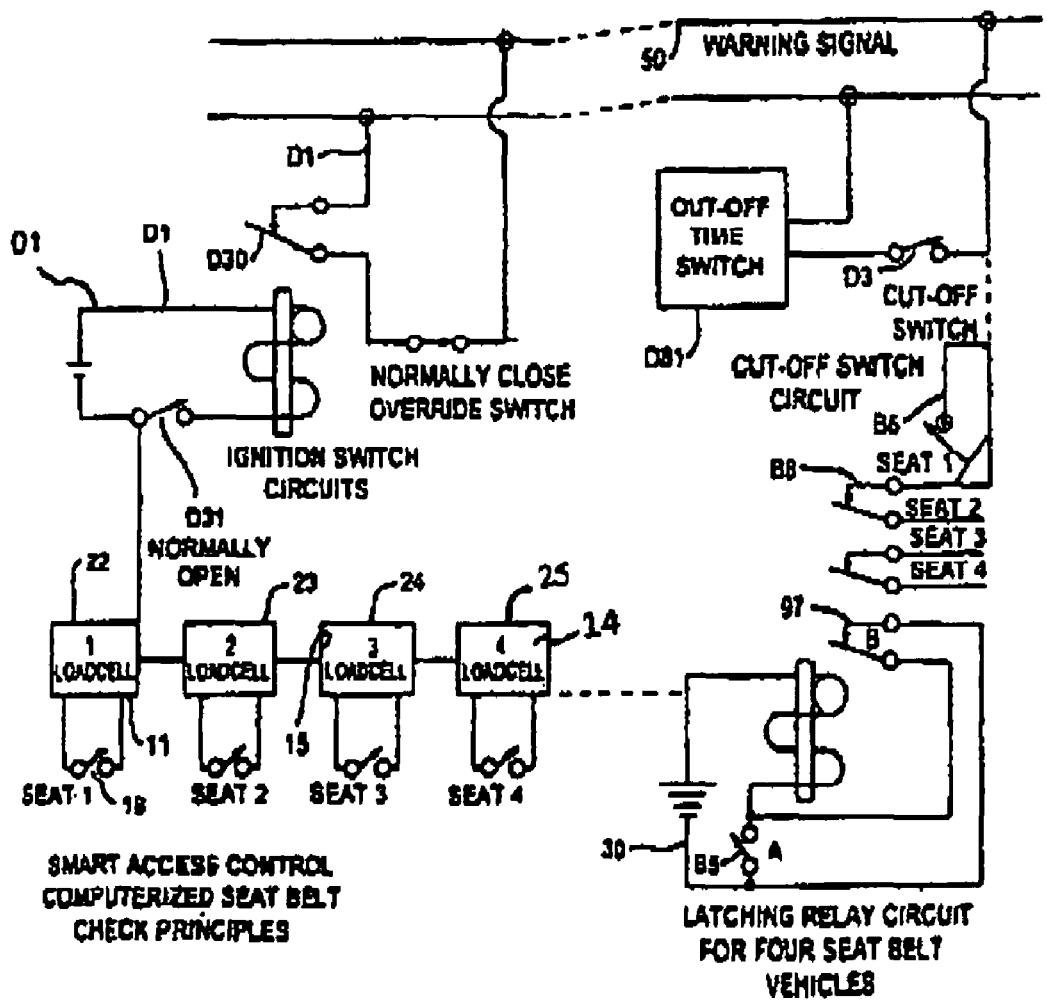
FIG. 7 is seen to represent an exemplary embodiment of occupant's access control for relaying seatbelt usage to properly control airbag deployment force.

Referring to FIG. 7, embodiments provide a classification system comprising a latching relay circuit 30 being operable with switch B5, Signal communication from B5 is for monitoring the use of seatbelt 17 on seats 1, seat2, seat3, and seat 4, and being configured for each seat. Embodiments provide rear sitting positions for four occupants 110, being operable as seat 1 configured with load cell 1, seat 2 configured with load cell 2, seat 3 configured with load cell 3, and seat 4 configured with load cell 4. Each of seats 1, 2, 3, and 4 further comprises load cell 15 and strain gauge 11 being embedded in a silicon substrate 14. Certain embodiments provide the seat surfaces 22, 23, 24, and 25 being operable with load cell 1, load cell 2, load cell 3, and load cell 4 to detect pressure from occupants 110. Switch 18 is being configured for each seat, and being operable to close when an occupant 110 is detected. Some embodiments provide communication signals to the seatbelt latching relay 30, being operable to check for seatbelt operation for the detected seat pressure. Embodiments further provide switch B5 of A of the latching relay 30, being configured with switch 97 of B for enabling communication to each seatbelt 17. When the male connecting end 46 of seatbelt 17 is connected to the female connecting end 5, signal is communicated through the harness D2 to the seatbelt override switch D30, being operable with the ignition switch 01. Communication signals are visually presented to the operator of the vehicle, and may be broadcasted in human voice auditory via warning device 50. Embodiments provide seatbelt 17 being buckled for seat 1, enabling switch 18 of seat 1 to be closed. Switch B8 is also closed in communication with processor 140 to compare other communication signals from seat 2, seat 3, and seat 4. Each of seat 1, seat 2, seat3, and seat 4 being configured with switch 97 communicatively connected to each seatbelt 17. Disclosed embodiments further provide at least one of: a cutoff switch, a normally open switch D31, out of time switch D81, a normally closed override switch D30, and a cut off switch D3 in communication with the cut off switch circuit B6.

The controlled release of gas 65, from the gas canister 60, into the combustion chamber 101 as shown in FIG. 3, is accomplished by the gas release valve relay 42 communicatively configured with the sliding pot 61, which is opened a specific amount as a result of the energy being generated by the accelerometer 40. As a result, the deployment force of the first air bag 1 correctly matches the force of the occupant 110 on the seat 10 as shown on FIG. 1.

With reference to figures, FIG. 1, seat cushion 12 and floor 100 are shown respectively. Seat 10 is mounted on a load cell 15, which is disposed between the seat mounting frame 16 and floor 100 of the vehicle. The load cell 15 ascertains the weight of the seat 10 and the occupant 110 therein. A temperature sensor 18 is configured with the load cell 15 for distinguishing between occupant's 110 and any conventional luggage. Disclosed embodiments provide the temperature sensor 18 being positioned to detect the feet and leg angle of occupant 110, and may include conventional infrared sensor being configured to sense occupants 110 body temperatures.

Turning to FIGS. 1 and 2, the preferred embodiment provides a system generally comprising the known standard configuration for occupants and drivers side frontal air bag. Both the passenger and the driver's version of the disclosure are configured similarly. Therefore, only the passenger side airbag system will be described in details.

In FIG. 3, the reference number 15 is seen to represent load cells mounted beneath the two front seats. In FIG. 3, the accelerometer 40 is seen constructed with the accelerometer spring 21, the accelerometer crystals 45, and the accelerometer mass 52. The accelerometer is operatively connected to the gas current igniter 55, and the measured acceleration D is seen to represent the operations of components of the accelerometer 40, being configured with the gas canister 60, in communication with a gas release valve relay 42 being communicatively configured for releasing of controlled gas 65 into the combustion chamber 101. A collision sensor 75 and a gas current igniter 55 are configured with the accelerometer 40 in communication with the gas canister 60 through processors 130, 135, 140, and 150. Processor 130 is communicatively configured with gas canister 60. Processor 135 is communicatively configured with collision sensor 75. Processor 140 is communicatively configured with seatbelt tension sensor 600 shown in FIG. 1. Processor 150 is communicatively configured with accelerometer 40. Processors 130, 135, 140, and 150 are operable through interactive communications with the CPU 26. The reference number 65 is seen in FIG. 4 to represent the controlled release of igniting gas 65. The reference number 67 in FIG. 4 is seen to represent the opening 67 of the sliding pot 61 for the gas canister 60, being operable for the controlled release of gas 65 into the combustion chamber 101. As shown, the controlled release of gas 65 is being pressured from the gas canister 60 into the release valve relay, to be released through the opening of the sliding pot 61, into the combustion chamber 101 for ignition by the gas current igniter 55 therein, for initiating a proportionate amount of deployment force of at least first air bag 1.

As shown in FIG. 3, the accelerometer 40 upon receiving amplified signal from the amplifier 20, enables communication through line signals to the gas canister sliding pot 61, operating the sliding pot opening 67, as shown in FIG. 4. The sliding pot opening 67, enables the gas release valve relay 42, to release the controlled gas 65 into the combustion chamber 101. The controlled release of gas 65, when ignited by the gas current igniter 55, deploys the air bag intelligently with a force that is proportionate to the weight of the occupant 110. The energy generated by the accelerometer crystals 45 displaces the accelerometer mass 52 in the accelerometer 40, to generate a corresponding amount of electrical energy therefrom, such as might occur if accelerometer 40 is piezoelectric accelerometer. The applicant also understands that this high accuracy weighing system is further operable to carry in vehicle information about occupant 110. Disclosed embodiments provide a ROM 59, a BIOS, a RAM 32, and software program in communication with the load cell 15; being operable for recording information about the weight of occupant 110. The BIOS provide basic control over the load cell 15 and the data is being stored in the ROM 59.

The ROM 59, which is a special chip, contains instructions and information in its memory that can not be changed, whereas the RAM 32 is a primary memory operable for storing the occupant 110 information. The accelerometer 40 generates electrical energy when put under mechanical stress. Applying pressure on the surface of the accelerometer crystal 45 creates the measured stress being initiated by the occupant's 110 applied weights on the seat 10. The accelerometer converts the measured weight corresponding to the weight of the occupant 110 into an acceleration value corresponding to the proper amount of acceleration at which the air bag 1, 2 would have to be deployed to protect the occupant 110 in the event of a collision.

The electrical energy generated by the accelerometer crystal 45 will displace the accelerometer mass 52 in the accelerometer 40, and the displacement force will react on the accelerometer spring 21, enabling the accelerometer spring 21, to contract to an amount proportionate to the occupant 110 applied weights on seat 10. The force reacting on the accelerometer spring 21 is proportionate to the weight of the occupant 110. Certain embodiments provide the collision sensor 75, in communication with the control module 25, being operable with the amplifier 20 to amplify the communication signal from the load cell 15, to the accelerometer microprocessor 150, and the release gas control processor 130, each being configured with the gas release valve relay 42. The control module 25 will enable the gas current igniter 55, to ignite the controlled release of gas 65, inside the combustion chamber 101 for the air bag 1. The force created during the combustion inside the combustion chamber 101, is the deployment force of the air bag 1. The speed of the vehicle and the collision threshold are being considered for enabling the activation of the airbag 1. Some embodiments provide apparatus that determines the crash severity and allow the seat belt 17 to lock the occupants 110 in place while the air bag 1 protects the occupant's upper body from moving. The load cell 15 differentiates adults from kids with the highest degree of reliability. Occupants 110 are differentiated from other objects though temperature sensor 18. The occupants 110 weight on the surface of the seat 10 and the occupants 110 weight on the floor 100 are transmitted to the load cell 15 to equal the occupant's input or weight. The weight information is kept constant so that even if the occupant 110 moves around the seat 10, the weight information, which is being stored at the address line 33 will not change. But when the occupant 110 finally leaves the seat 10, the erasable programmable read only memory—EPROM 34 will erase the occupant's 110 weight information from the address line 33. That is, when a new occupant 110 is seated, new information will be sent to the address line 33. Accordingly, the parameter of weight for the air bag to enable deployment is precisely determined.

With the smart seat belt control system, "U.S. Pat. No. 6,728,616," and the disclosed embodiment the actual weight of the occupant 110(,) is measured when the occupant 110 is seated and or belted. Embodiments provide correct occupants weight values in communication with the computer 500 to enable calculation of the occupants 110 mass. Referring to FIGS. 1 and 5, certain embodiments provide proper deployment force of for the airbag 1, 2. Even if the occupant's 110 legs 320 are on the dashboard 300, the weight information will not change, but the occupant's legs 320 will trigger a pressure sensor 310 that will warn the occupant 110 of an unsafe behavior. The warning signal, for example, may be a human voiced auditory warning signal, and may only go off when the behavior is corrected.

Disclosed embodiments are programmable to prevent deployment when a child's weight is sensed on the seat 10. That is, the child's weight could be defined as a weight limit of less than 20 lb, provided the child is properly belted. Embodiments further provide method to reduce air bag 1, 2 induced injuries when deployed. Because the deployment force is proportionate to the occupant's weight on the seat 10. Disclosed embodiments further provide the load cell 15 to sense occupant's weight on the seat before controlling the deployment of the airbag 1, further eliminating the inherent deficiencies on prior art devices. The load cell 15 intelligently measures the part of the occupant's weight that is on the floor 100 and the other part of the weight on the seat 10, thereby guaranteeing accurate measurement of the occupant's weight. In addition, ones the occupant 110 is seated, the exact weight reading of the occupant 110 is measured and sent to the address line 33. So that when the occupant 110 constantly moves around the seat 10, the weight value at the address line 33 will not change.

FIG. 6 illustrates a seatbelt device being configured with a motor 102,

Referring to FIG. 2, the EPROM 34 will only change the weight value when the occupant 110 is totally replaced. If the occupant 110 is properly belted, during high-speed crashes, the occupant 110 will fully benefit from the disclosed embodiments because the airbag 1, 2 is operable to hold the occupant 110 in place, while preventing the occupant's 110 upper body from moving.

The preferred embodiment includes the known standard configuration of the occupant 110 and driver's side air bags 1, 2. The position of airbag 1, 2 could be front, side, ceiling, or any other airbag. Embodiments provide airbags 1, 2 operable to be accurately deployed based on the weight and mass of the occupant 110. Specifically, more than one load cell 15 may be used to accurately compute the occupant's weight for accurate deployment of the air bags 1, 2.

In place of the load cell 15, any conventional pressurized bag, inflatable bag or inflated bag could be mounted on the surface of the seat 10 or beneath the seat 10, and configured to enable interactive communication for airbag deployment. When an occupant 110 takes the seat 10, the weight of the occupant 110 will displace X amount of the stored pressure in any conventional gas release valve relay 42. The weight of the occupant 110 will initiate airbag to inflate X amount of air to the gas release valve relay 42 that will record the displacement X, or inflation X, as the occupant's 110 weight value. The displaced pressure or inflated air pressure is the maximum pressure that when the collision sensor 75 senses a collision, it will activate the accelerometer 40 which will then initiate a deployment speed and force of the air bags (1,2) that will equal the maximum displaced pressure X, where the stored pressure is the maximum pressure for the maximum acceleration and deployment force of the air bags 1, 2 being initiated when the collision sensor 75 senses a collision of a preset magnitude.

The weight of the occupant 110 will displace the stored pressure to an amount X that is equal to the weight value of the occupant 110. If the weight value exceeds the stored pressure, then the acceleration and the deployment force will have a constant value when a collision is sensed. The recorded displacement X will be transformed into a weight unit for the CPU 26 to recognize it. The CPU 26 will then carry on the calculations and computations the same way as if the weight information had been received from the load cell 15. Every process is the same from the displacement point X, when comparing to the conventional pressurized bag operation with the load cell 15 operation. Accordingly, for a more accurate description, only the load cell 15 will be elaborated upon in the description.

Thus, applicant is claiming the use of any conventional pressurized bag used for occupants 110 restraint system. Adopting pressurized airbags to control the deployment force of air bag 1, 2 for protecting occupant 110, and preventing any further injury to the occupant 110 during collision is one object of disclosed embodiments.

The air bag system generally comprises the known standard configuration for an air bag 1, all configured are operable in the same manner. Referring to FIG. 3, when a conventional ignition switch is turn on an electrical current of 5 milivolt energizes the load cell 15 before the computer is enabled. When the occupant 110 sits on seats 10, load cell 15 utilizes the input from the occupant's 110 to start strings of events that are being sent to the RAM 32 to enable data processing and computation. The post 36 inside the computer will then check all the hardware components functionality to ensure that the hardware components and the CPU 26 are functioning properly. The post 36 is operable to send signals over specific paths on the chip motherboard 38 for the load cell 15 to account for the weight signals or responses to determine the occupants 110 actual weight value. The input energy from the occupants 110 body when seated is received as force energy. The load cell 15 is operable for outputting force energy as weight in communication with the control module 25 being configured to identify the seat 10 that has the occupant 110, before activating the motherboard 38. This chip motherboard 38 is where all activities are sent for processing. The result of the post 36 reading is being analyzed in the CMOS 27. At the completion of the post 36 readings, the boot program will then check to ensure that there is an occupant 110 on seat 10. Embodiments provide a program operable to send the occupants 110 weight data to the address line 33.

Referring to FIG. 4, the air bag assembly 400 generally comprises the known standard configuration for occupant air bags 1. Referring to FIG. 1, embodiments provide the seat 10 being mounted on the load cell 15, and bolted between the mounting metal frame 16 of the seat 10 and the floor 100 of a conventional vehicle in order to provide a solid support and attaching structural strength. Certain embodiments provide mounting the seat 10 on the load cell 15 being supported by a fixed structural base such as the seat mounting frame 16 being provided for precise and accurate loading of the occupants 110 weight on the load cells 15. The load cell 15 ascertains the weight of the seat 10 and any occupants 110 therein. The load cell 15 can also be calibrated so that the weight of the seat 10 will be the zero point reading. Mounting the load cell 15 between the seat mounting frame 16 of the seat 10 and the floor 100 of the conventional vehicle, or on a rigid sliding, or fixed surface, rather than within the cushion of the seat 10, the load cell 15 is more likely to obtain an accurate computation of the occupants 110 weight.

Referring to FIG. 3, each load cell 15 has at least one or more strain gauges 11 that are configured to sense a force applied to them when an occupant 110 sits on the seat 10. The strain caused by the force of the occupant 110 on the seat 10 is measured by the strain gauge 11, which delivers an electrical line signal to the control module 25. The computation of occupants weights is not subjected to faulty readings as it would be if the sensors were mounted in the seat cushion 12 of seat 10. If mounted in the seat cushion 12, any uneven loading of the occupants 110 weight could cause inaccurate estimation of the weight of the occupants 110 on the seat 10. Disclosed embodiments provide a load cell 15 weighing system being configured with software for in vehicle information system.

Referring to FIG. 3, the applicant asserts that the high accuracy weighing system is being provided to carry in vehicle information about the occupant 110, which may also be achieved by incorporating a ROM or BIOS memory 59, a RAM memory 32, and a software program inside the load cell 15, to record information about the weight of the occupants 110.

The deployment of air bag 1,2 generates a deployment force proportionate to the computed weight of the occupant 110 on the seat 10. The software program is communicatively configured to communicate communication signals to the computer system 500, the accelerometer 40, and the gas canister 60, each being operable to properly protect the occupants 110 when the vehicle is in motion. Air bags 1, 2 are in the vehicle and controlled by the computer system 500.

Conclusively, there have been many complains about occupants not wearing their seatbelt 17 when a vehicle is in motion. The aftermath has resulted in many fatalities. Yet, the behaviors are increasing each year. Accordingly, embodiments provide methods of preventing vehicles from starting if there is no occupant 110 on seat 10. Referring to FIG. 7, embodiments provide signal communication circuit for seat 10 and seatbelt 17, enabling a monitoring configuration for seatbelt 17. Seat 10 is seen to represent rear sitting positions for four occupants 110, represented as seat 1 configured with load cell 1, seat 2 configured with load cell 2, seat 3 configured with load cell 3, and seat 4 configured with load cell 4. When the seat surfaces 22, 23, 24, and 25 senses pressure from occupants 110, switch 18 is enabled, allowing communications signal to the seatbelt latching relay 30, configured for the seatbelt 17. Switch B5 of A of the latching relay 30, in communication with switch 97 of B being operable for each seatbelt 17. When the male connecting end 46 of seatbelt 17 is connected to the female connecting end 5, signal is communicated through the harness D2 to the seatbelt override switch D30, being configured with the ignition switch 01, and the voice auditory warning device 50. When seatbelt 17 is buckled for seat 1, switch 18 of seat 1 is closed, switch B8 is also closed, allowing processor 140 to compare other communication signals from seat 2, seat 3, and seat 4. Each of seat 1, seat 2, seat3, and seat 4 is configured with switch 97 communicatively connected to each seatbelt 17, shown on FIG. 7. Seatbelt 17 is configured with a moveable coil 95 being operable for tensioning occupant 110 per the rotation of wheel 120 based on weight.

Coil 95 is mounted on two shafts 94 that have wheels 120 at each end. The wheels 120 are rotated as coils 95 receive collision signal from the collision sensor 75. A stopper plunger 130 is engaged between the wheels 120 when coil 95 completes a winding initiated by processor 140. Coil 95, receives constant current I, as the ignition switch 01 is turn on.

When occupant 110 is on seat 10, occupant 110 must wear seatbelt 17 to allow the vehicle to start. If occupant 110 wears seatbelt 17 only to start the car, when seatbelt 17 is disconnected, cut off switch D3 being configured with circuit B6, will enable the engine to cut off with time. The engine only stays running when seatbelt 17 is worn by occupant 110 on seat 10. Applicant has realized that, by configuring seatbelt 17 to be disconnected only when the engine is not running "U.S. Pat. No. 6,728,616, and U.S. Ser. No. 09/959,503," or by using an override switch when the vehicle is in motion, occupants 110 is eliminated from the confrontation of kids disconnecting the seatbelt 17 while the vehicle is in motion.

Embodiments further provide a system through which once occupant 110 on seat 10 wears seatbelt 17, processor 140 would be in communication with the computer system 500. Signal is provided for the seatbelt not to be disconnected unless the engine is turn off or the vehicle comes to a complete stop. That is, processor 140 will monitor seatbelt 17 connections and disconnection processes and disable signals to the key switch or starting system when occupants 110 on seat 10 is not wearing seatbelt 17. If there is an occupant 110 on any of the seat 10, without the seatbelt 17 being buckled, the engine will not start. If occupant 110 wears seatbelt 17, occupant 110 will not be able to disconnect seatbelt 17 unless the vehicle comes to a complete stop or the engine is turn off.

Some embodiments provide the load cell 15 being communicatively configured with computer system 500 to support the control of the deployment force of air bag 1, 2, so that the safety of occupants 110 on seat 10 is a prime factor. In conjunction with the load cell 15, seat belt 17 is worn at all times. Even if occupant 110 is on seat 10 and if seat 10 is mounted at the rear sitting position, without wearing seatbelt 17, the processor would prevent the engine from starting. If occupants 110 decide to stop and pick another occupant 110 with the engine running, or if occupant 110 enters the conventional vehicle and fails to put on seatbelt 17, processor 140 will enable signal to the latching relay 30 being configured with the ignition switch 01 to shut off the engine. The vehicle is only started when occupants 110 buckles-up seat belt 17. Thus, disclosed embodiments provide protection for occupants 110 on both frontal and rear seat 10.

The load cells 15 are installed on the sensitive seating positions to gather information about the occupants 110 on seats 10. The load cell 15, which may include corrosion resistant high alloy steel with a dynamic load cell capacity of up to 1000 lb or more, is being constructed from machined high steel beams with strain gauges 11 bonded inside. The load cell 15 for disclosed embodiments is configured for vehicles with air bags 1, 2 or any restraint system like the seatbelt 17. The strain gauges 11, which are configured with electrical resistance elements, are properly sealed with sealant that will not allow moisture or any contaminant to disrupt the strained information. When occupants weight on seat 10 is determined, load cell 15 will process the information as weight, as the weight of occupant 110 is being applied on the strain gauges 11. The strain gauges 11 is then strained to the weight amount of occupant 110. Load cell 15 will output this amount as the occupants 110 weight value. Accordingly, the weight of the occupant 110 will generate a reaction force on seat 10 that is being measured, in communication with on the airbag 1, 2 to enable deployment.

This applied weight enables strain gauges 11 to strained, compressed, pressured, or stretched in a corresponding amount, causing a voltage change on the harness. As strain gauges 11 are stressed, strained, compressed, or pressured, the effective resistance of strain gauges 11 will vary in an amount corresponding to the strain. The strain thereacross varies in an amount corresponding to the actual weight of occupant 110. Specifically, the induced voltage across each strain is divided so that a voltage signal is obtained that corresponds to the weight of the occupant 110 on seat 10. The control module 25, which is a silicon control rectifier, is operable intelligently and identifies seat 10, where the weight signal is outputting from, and would manage the flow of the weight data to ROM 59. The control module 25 delivers data from load cell 15 to the CPU 26, which comprises ROM 59 that has a basic input and output system BIOS. The CPU 26 is further configured with the RAM 32, and at least one software program being configured for calculating occupants 110 mass value. The RAM 32 run the software program to access the address line 33.

The ROM 59 receives data about the occupant 110 from the control module 25 and communicates with the basic input and output system BIOS, which is operatively connected to ROM 59 and programmably configured with the address line 33. The RAM 32 operates load cell 15 data about the occupant 110 from the address line 33 and turn over to the CPU 26 to manipulate.

The CPU 26 uses the address line 33 to find and invoke the ROM 59 to insure an accurate calculation of occupants mass value and any other information needed for communication with the accelerometer 40, including signal for tensioning of seat belt 17 when the impact force is determined. The CPU upon calculating the occupant mass value provides the information to the accelerometer microprocessor 150 in communication with the CPU 26 to process and energize the accelerometer crystal 45. The crystals 45 then uses the processed information from the CPU 26 and the standard 5 milivolts from the starting system to generate a control energy for enabling the deployment force and acceleration of the air bag 1,2 that is proportionate to the load cell 15 output weight value for the occupant 110.

The crystal 45, upon receiving the 5 milivolts energy from the starting system and the occupant weight information from the CPU 26, generates electrical energy on its surface that is proportionate to the occupant's weight. This energy being generated by the crystals 45 is used to energize the accelerometer mass 52. The accelerometer mass 52 movement is dependent on the energy being generated by the crystals 45 and acting on a spring. This energy that is generated by the crystals 45 is equal to the force needed to move the accelerometer mass body to the distance D. The same energy from the crystals 45 is used to energize the canister microprocessor 130 in communication with the sliding pot 61 and the gas release valve relay 42 being operable to adjust to an opening 67 being operable to release proportionate amount of igniting gas and igniting current to enable a proportionate deployment force for the air bag 1, 2. The sliding pot 61 and release valve relay 42 are enabled by the generated control energy and a proportionate amount of gas is equally released based on this energy amount.

The gas current igniter 55 is operatively connected to the accelerometer and communicatively configured with the air bag 1 to ignite the controlled release gas 65 into the combustion chamber 101 of the air bag 1, 2 to assure the appropriate and safe deployment force. Where the amount of current is being generated to ignite the controlled release gas 65 is proportionate to the voltage generated by the crystal 45. The voltage generated by the accelerometer crystal 45 is then transformed, enabling a voltage to current transformation 56 to initiate the proportionate amount of current to ignite the controlled release gas 65 into the combustion chamber 101 of the air bag 1, 2. The amount of voltage that is being transformed is proportionate to the energy from the accelerometer crystal 45, which is proportionate to the weight of the occupant 110, enabling the air bag 1 to deploy based on the energy from the combustion force. As the controlled release gas 65 is ignited, combustion is created inside the air bag 1, 2.

The space where the combustion takes place is the combustion chamber 101, and the combustion energy deploys the air bag 1, 2 at a speed and force that is proportionate to occupants weight, without causing any further injury to occupants 110. The distance D that the accelerometer mass 52 travels is equal to the distance the accelerometer spring 21 contracts. The weight of the occupant 110, the energy being generated by the accelerometer crystal 45, the force acting on the accelerometer mass 52, and the contracting force of the spring 21 are all proportionate. The distances D that the mass travels is proportionate to the distance the accelerometer spring 21 contracts.

Because components of disclosed embodiments exhibit electromechanical responses that enable equal values, the contraction of the accelerometer spring 21 created by the energy being generated by the accelerometer crystal 45 is proportionate to the deployment force and acceleration for the air bag 1, 2. When at least an occupant 110 is replaced, the EPROM 34 will control the information about the changing occupant 110 at the address line 33. The amplifier 20 is responsive for amplifying signal communications to enable a speedy output to the accelerometer when a collision is sensed of the pre-set magnitude.

All the configurations and operations of the processors are responsive to signals, turning on and off different combinations of transistorized switches 04. These processors are configured to operate the arithmetic logic unit that handles all the data manipulations and are operatively connected to the RAM 32 through the computer motherboard 38. The motherboard 38 interface unit receives data and software instructions from the computer RAM 32.

The data are configured to travel 10 bits at a time, enabling the branch prediction unit to then inspect all the processed instructions to decide on the logic unit. The CPU 26 translates the response from the load cell 15 into the instructions that the arithmetic logic unit "ALU" can handle. The ALU processes all data from the electronic scratch pad or register that is made secured on the motherboard 38. All results are made final at the RAM 32.

The load cell 15 serves an initial and secondary purpose. Initially, a base line detection platform is developed in conjunction with the load cell 15 configuration, representing the weight of only the occupant's seat 10. Once the initial base line is ascertained, during the operation of the vehicle, if the base line amount is not exceeded by a certain amount, the air bag 1, 2 is disabled, thereby preventing the air bag 1, 2 from deploying if occupant 110 is not present. The boot program sends a 0 message to the RAM 32 and the RAM 32 is operable to recognize 0 data as an empty seat 10.

The load cell 15 secondarily function is to accurately weigh occupant 110 when the baseline representing the weight of seat 10 is exceeded. The information is then communicated to the control module 25, which will then determine the air bag 1, 2 that should be deployed in case the vehicle is involved in an accident. This determination is centered on line signals from the load cells 15 to the control module 25 that is configured for activating other devices to initiate the proper force at which the air bag 1, 2 should be deployed once occupants 110 weight is determined. The control module 25 is defined as a device that transmit load cell 15 communication signal through internal configuration with an encoder communicatively connected to other devices. The encoder, which is an analog to digital transmitter, transforms load cell 15 output signals from analog to digital and communicates to the address line 33 as occupants weight. The RAM 32 then receives the digital weight signal from the address line 33 and sends to the CPU 26 for computations.

The CPU 26 then calculates occupants 110 mass and all the necessary information to enable a safe deployment of the air bag 1, 2 without causing any further injuries to the occupant 110. All information are transmitted through line signals, turning on and off different combinations of transistorized switches 04. The control module 25 is in communication with amplifier 20 operable to amplify signals from accelerometer processor 150 when a collision is sensed by the collision sensor 75. The collision sensor 75 could be at least a proximity sensor to detect collision and provide communication signals at about 0.001 seconds before the actual collision. Accelerometer 40 computes air bag 1, 2 deployment acceleration from the weight and mass data about occupant 110 at the address line 33. The accurate deployment force at which the air bag 1, 2 should deploy is then provided based on occupants weight. The accelerometer microprocessor 150 is amplified when the collision sensor 75 senses a collision of predetermined magnitude. The safe acceleration required at the deployment point is directly proportionate to the force being computed from the weight of occupant 110. The acceleration for airbag 1, 2 is based on the measurement of the force acting on the mass 52 of the accelerometer 40. The collision force exacted on the occupant 110 is measured and airbag 1, 2 deployment forces is determined by generating a force necessary to prevent the occupant 110 from moving relative to the acceleration.

The mechanical spring 21 and the accelerometer mass 52 inside the accelerometer 40 Provide resonance. Where the resonance is define as the peak in the frequency response. The frequencies generated during the movement of the accelerometer mass 52 must be less than the resonant frequency. The accelerometer 40 is dynamic. Accordingly, the load cell 15 receives occupants 110 weight and provide communication signal to control module 25 being responsive to the occupants weight data, and in communication with the encoder operable to transform the weight from analog to digital and communicatively connected to the ROM 59. The ROM 59 checks the software instructions about the occupant 110 for confirmation before communicating the weight information to the address line 33. The information is then kept secured and protected from vibrations and bumps so that the RAM 32 and or the EPROM 34 can activate the data.

The RAM 32 receives occupants 110 information from the address line 33 and enables communication with the CPU 26 for computations of occupants 110 mass. The information is then sent to the accelerometer crystal 45 that communicatively generates electrical energy proportionate to the weight of the occupant 110 on seat 10. The energy generated by the crystal 45 enables motion on the accelerometer mass 52, and the accelerometer spring 21 is operable for setting the deployment force and speed of airbag 1, 2.

When collision is sensed at the collision sensor 75, if the magnitude of the collision exceeds a preset limit were injuries are certain, collision sensor 75 will enable communication signal to accelerometer processor 150. Accelerometer processor 150 will then communicate to control module 25 to assure that the occupied seat 10 contain an occupant 110. Control module 25 is configured with amplifier 20 being further operable for empowering the gas release valve relay 42 being configured with processor 130 to initiate the volume of controlled release gas 65, that when ignited, will generate a deployment force that is proportionate to the weight of occupant 110 on seat 10. Collision sensor 75 senses collision of a prescribed magnitude and communicates to control module 25.

Control module 25, is in communication with the load cell 15 being operable for outputting signals and discriminate against empty seat 10 to ensure deployment of only air bag 1, 2 with occupied seat 10. Control module 25 output communication signals through specialized array to CPU 26 in communication with the accelerometer 40. The value of the occupant's weight will initiate an equal amount of force that is communicated as input to the accelerometer crystal 45. This input force acting on the accelerometer crystal 45 enables the crystal 45 to generate electrical energy that is proportionate to the applied force. The electrical energy created by the accelerometer crystal 45 is output to the accelerometer mass 52, which is operatively connected to the accelerometer spring 21. The force acting on the spring is proportional to the weight of the occupant 110. Referring to FIG. 2, a transient voltage suppressor 200 is located between the control module 25 and the address line 33. Recognizing that electronic equipment characteristically suffers from transient voltage spikes and that such spikes would cause abnormal readings or reactions for the RAM 32, embodiments provide voltage suppressor 200 being operable to filter out transient spike phenomenon. Thus, the accurate weight value is ensured.

The electrical signal from load cell 15 is further amplified by transistorized switches 04 configured with control module 25, communicatively connected to assist in managing the flow of data, enabling input and output signals to the CPU 26 for computation. Control module 25 discriminates between occupants 110 on occupied seat 10 and un-occupied seat 10 through load cell outputs to determine which air bag 1, 2 is to be enabled. Signals are processed by the encoder in communication with the control module 25. The accelerometer 40 is configured with the amplifier 20, and sends line signals to the gas canister sliding pot 61, to open to an area that would timely allow controlled gas 65 into combustion chamber 101.

The volume of controlled gas 65, when ignited by the gas current igniter 55, enables combustion inside the air bag 1, 2 for generating a deployment force that is proportional to the weight of occupant 110 and safely holds occupant 110 on the seat without causing any further injury.

Because the readings from the load cell 15 are dynamic, a new acceleration value is computed each time a new weight signal is communicated from the load cell 15. The weight value from the address line 33 is operatively communicated to the accelerometer 40 to apply a proportionate amount of force against the accelerometer crystal 45. The energy generated by the accelerometer crystals 45 displaces the accelerometer mass 52 configured with the accelerometer spring 21 to generate a corresponding amount of electrical energy therefrom, such as might occur with a piezoelectric accelerometer. The accelerometer crystal 45, when put under stress, generates electrical energy. The stress is initiated when the 5 milivolts is enabled to activate the load cell 15 for providing communication signal to the control module 25 in communication with the CPU 26. The CPU 26 distributes communication signals to other devices for disclosed embodiments, including the accelerometer crystal 45 to enable pressure across crystal surface. Other types of accelerometer may be used, but only one would be described in detail for disclosed embodiments.

The electrical energy generated by the accelerometer crystals 45 could be at least in milivolts. The resultant voltage developed by the accelerometer crystals 45 is correlated to the necessary force required for protecting the occupant 110. The voltage functionally transforms into current 56 for variably igniting the controlled release gas 65 through the gas current igniter 55. The energy created by the accelerometer crystal 45 is equal to the amount of energy to initiate movement of the gas canister sliding pot 61 and the gas release valve relay 42, enabling variable systems operation of the airbag assembly 400. The generated voltage enables communication signals responsive to the occupants weight for generating the current igniter 55 to ignite the igniting gases 65 upon release from the gas canister 60 into the combustion chamber 101. The combustion chamber 101 is the interior space of the air bag 1, 2, where the controlled release gas 65 and the gas current igniter 55 ignite when a collision of a prescribed magnitude is sensed by collision sensor 75. The igniting gas further initiates the control of deployment force of air bag 1, 2. The current flow and the volume of controlled release gas 65 being employed are controlled to provide the desired expansion rate of the air bag 1, 2.

Thus, there is an allowance for a changeable variation between the upper and lower threshold for enabling the deployment force of the air bag 1, 2. Therefore, regardless of the changing weight of the occupant 110, the proper amount of the controlled release gas 65 is ignited by the gas current igniter 55 to propel the air bag 1, 2 with just enough force to cushion occupant 110, without causing any further injury to occupant 110.

The control module 25 analyzes output signals from the load cell 15 as the occupants 110 weight, and converts the output into a weight value. The weight value corresponds to the weight of occupant 110, which is then sent to the address line 33. The RAM 32 communicates the weight signal from the address line 33 to the CPU 26 to calculate the occupants 110 mass. The weight value and the mass value are then communicated to the accelerometer processor 150 in communication with accelerometer 40. The accelerometer 40 converts the weight value corresponding to occupants 110 weight into an acceleration value corresponding to the proper amount of controlled release gas 65 that when ignited, enables the acceleration at which air bag 1, 2 would have to be deployed to protect occupant 110 when a collision of the prescribed magnitude is sensed.

CPU 26 is configured to control the gas discharge processor 130 being operatively configured with the gas release valve relay 42. Thus, gas canister sliding pot 61 is enabled by the controlled energy from the accelerometer crystal 45, configured with the CPU 26, to provide the initial desired expansion rate of the air bag 1, 2. There is an allowance for infinite variation between an upper and lower threshold for the deployment force of the air bag 1, 2. Therefore, regardless of the weight of the occupant 110, the proper amount of controlled release gas 65 is ignited to propel the air bag 1, 2 with just enough force to cushion occupant 110 without causing any further injury.

The controlled release of gas 65 from the gas canister 60 is enabled by a sliding outlet pot 61, which is opened to discharge the controlled release gas 65, through opening 67. A specific amount of controlled release gas 65 is initiated through the voltage generated by the accelerometer crystals 45. As a result, the force of the deploying air bag 1, 2 is correctly matched with occupant 110 weight.

Referring to FIG. 2, embodiment is employed in the event of a rear end collision, comprising a radar unit 70 being operable to sense the imminence of a rear impact. The data from rear end collision is communicated to control module 25, which controls the detection of occupants 110 on seats 10 to enable the deployment of the air bag 1, 2 with the proper force. In a frontal impact of about 13.2 MPH, collision sensor 75 is activated. The speed of 13.2 MPH represents the threshold speed at which the efficacy of any air bag system should usually become activated. At collisions of below the 13.2 MPH, the air bag system tends to become less effective and expensive to deploy, thus disclosed embodiment is operable even if the front impact is of an extremely low speed. The preferred embodiment would not engage the airbag device 400 until occupant 110 is detected and the front impact speed of about 13.2 MPH and above is achieved. Thus, if the collision force is greater than the force normally created by a speed of about 13.2 MPH, airbag assembly 400 would be responsive because at speed 13.2 MPH, when an on coming vehicle is driving at above 13.2 MPH, the force would vary, thereby enforcing further injury. Disclosed embodiments include airbag assembly 400 being operable responsive to the speed of the vehicle, the occupants 110 weight, and the collision force during impact. The data stored in address line 33 is used as the proper force calibration, and the air bag 1, 2 would deploy with the proper volume of propellant.

The weight of occupant 110 is correlated into an expected impact force and the desired amount of propellant or controlled release gas 65 is ignited in the combustion chamber 101 for air bag 1, 2 by the gas current igniter 55 to provide the cushioning which balances this force, but does not over power occupant 110 and force occupant 110 backwards into seat 10 at such a rate as to cause injury.

To employ the present invention in the case of a rear end collision as further shown in FIG. 2, embodiment provides a radar unit 70, being operable for sensing the imminence of a rear impact. The rear impact data is received by the radar receiver 71, which is operatively configured with the radar unit 70 and communicatively connected to the control module 25, which discriminates between the occupied seat 10 and the unoccupied seat 10. The amplifier 20 is operatively configured with the radar unit 70 and communicatively connected to receive signals from the control module 25. Amplifier 20 amplifies the deployment process of the air bag 1, 2.

The radar unit 70 and the radar receiver 71 are seen to illustrate the primary embodiment for communicating rear-end collision. In the illustration of FIG. 4, air bag 1, 2 has two layers 3, 4 to further minimize the impact of deployment force. An internal layer 3 is the base of the air bag 1, 2, which is configured to be deployed according weight and collision force. An external layer 4 is the cushion layer characterized by being foamy. There is a gap 6 between the two layers 3, 4 being operable for providing a cushion-like contact on occupant 110. The weight of the occupant 110 is correlated into an expected impact force and the desired amount of propellant or controlled release gas 65 for the air bag 1, 2 is ignited to provide the cushioning which balances this force, but does not over power occupant 110 or force occupant backward into seat 10 at such rate as to cause injury. The greater the volume of propellant or controlled release gas 65 for the air bag 1, 2, the smaller the gap between the two air bag layers 3, 4 upon deployment associated with such controlled energy. Thus, the two-layer air bag 1, 2 serves to maximize protection for occupant 110 and further prevent air bag deployment injuries.

Certain embodiments provide several conventional sensors 7, 8 at least one positioned on seatbelt 17 being configured for restraining occupant 110 on seat 10, and at least one positioned on air bag 1, 2. Sensors 7 and 8, which comprise magnetized elements, are configured to communicate to each other to direct the deployment of air bag 1, 2 away from occupants head to further prevent any further injury.

Time constant is so important in the configuration of the computer 500 because the timing of the collision severity and the deployment of the air bag 1, 2 determines the importance of the deployment force for disclosed embodiments. The computer 500 uses different time constant circuit, but only the RL time constant will be addressed for now.

The RL time constant is an inductor and resistor used for the design of the time circuit for the computer 500 and control module 25. When current is transmitted to the computer 500, a magnetic field is enabled around the inductor. If the current is interrupted, the magnetic field collapses very quickly. The magnetic field is allowed to collapse at a controllable rate by an intermediate condition responding between maintaining the magnetic field and allowing it to collapse rapidly. The resistor is operatively configured to determine the rate at which the magnetic field collapses. The time constant is further configured as a measure of the time required to discharge the controlled release gas 65 into the combustion chamber 101 for ignition of the air bag 1, 2 deployments force. The time constant is operatively configured to respond to the specific amount of time required to attain 100 percent of discharge of the controlled release gas 65 into the combustion chamber 101.

Accelerometer 40 generates electricity when put under mechanical stress. This stress is caused by applying pressure or force against the surface of the accelerometer crystals 45. The stress effect takes place in crystalline substances like quartz, rockelle salts tourmalines, diamonds, and sapphires. The resulted pressure in the accelerometer 40 causes an electric potential, which is communicated through wire harness to enable the opening of gas release valve relay 42 in communication with the gas canister 60. Occupants 110 exact force on seat 10 by seating. The electromotive force created by the accelerometer 40 is extremely small, and is measured in milivolts or microvolts. The small amount of emf keeps computer 500 safe at all time. Embodiments further utilizes built in logic in the CPU 26 to precisely control all communication systems that provide means for activating the air bag 1, 2.

The processors are communicatively configured to provide sensed information to the CPU 26 and other devices responsive to occupant 110 on seat 10. The CPU 26 is responsive to communication signals operable to provide variable force-speed deployment and instantaneously regulating all the classified information. Control module 25 is operatively configured with the CPU 26. The amount of controlled release gas 65 is properly controlled to protect vehicle occupants of all sizes. The controlled release gas 65 and the gas combustion occur in variable mode due to changing occupants 110.

Control module 25 delivers data from the load cells 15 to the CPU 26. The CPU 26 is configured with RAM 32 operatively configured to run at least one software program in the CPU 26, being further configured to calculate occupants 110 weight values. The BIOS is operatively configured to store load cell 15 data as a weight measurement in address 33 lines. The RAM 32 runs the software program to access the address line 33, and communicates all data to the CPU 26 to calculate the mass and confirm the weight measurement on seat 10.

In one embodiment, the air bag assembly 400 comprises one or more air bags 1, 2 operatively connected to a deployment system. In another embodiment, the deployment system comprises a combustion chamber 101 that is operatively connected to gas canister 60 containing controlled release gas 65. The air bag assembly further comprises at least a microprocessor 150 communicatively connected to an accelerometer 40 that is configured with gas canister microprocessor 130 and operatively connected to gas canister sliding pot 61. The gas canister microprocessor 130 is communicatively connected to a gas release valve relay 42 and gas current igniter 55. The gas canister sliding pot 61 is operatively connected to accelerometer 40 and combustion chamber 101.

The operating weight value is processed within the air bag assembly 400 by microprocessor 150. Microprocessor 150 delivers a signal corresponding to the operating weight value to the accelerometer 40, which translates the signal to a corresponding proportionate electrical energy that is operable to energize the accelerometer crystal 45 in the accelerometer 40. The energy from the accelerometer crystal 45 is thus also proportionate to the operating weight value, which represents the weight of occupants 110 in seat 10. The electrical energy from the accelerometer crystal 45 is converted to mechanical energy and employed to displace the accelerometer mass 52 in the accelerometer 40. The distance D of the accelerometer mass 52 is directly related to the energy being created by the accelerometer crystal 45. The accelerometer mass 52 abuts the accelerometer spring 21, which is correspondingly compressed by the displacement of the mass to an amount, which is directly related to the distance D. The accelerometer spring 21 compresses as the accelerometer mass 52 moves, and the compression is thus directly related to the energy created by the accelerometer crystal 45, which is directly related to the operating weight value of occupant 110 on seat 10.

The compression of the accelerometer spring 21 is the culmination of translating the electrical energy applied to the accelerometer crystal 45 into mechanical energy applied to the gas canister sliding pot 61, to adjust to an opening 67 for releasing to controlled gas 65 into combustion chamber 101 for ignition. The gas canister microprocessor 130 receives the same communication signals from the microprocessor 150 that was delivered to the accelerometer 40, corresponding to the operating weight value. The gas canister microprocessor 130 utilizes communication signals to communicate to the gas release valve relay 42 the amount of specific volume of the gas 65 that is to be released into the combustion chamber 101.

In deciding the required speed at which the computer logic should respond to occupants weight value during collision, the decimal readings are transformed into binaries. The electronic switches 04 are operable to recognize the binaries as OFF and ON switches being configured to represent "1s" and "0s". Where the 0s represent OFF signals and the 1s represent ON signals. The OFF is an open circuit and the ON is a closed circuit. Below are the weight values in decimals and binary representation of the OFF and ON electronic switching. The binaries are logically used to inform computer 500 to operate the number of switches that are need to be turn ON and OFF to influence accurate responses to the weight values during collision. Accordingly, computer 500 energizes active devices to activate the control module 25 for enabling deployment of air bag 1, 2 without causing further injury to the occupant 110.

As could be seen, below are some of the few weight sizes that shows how fast computer 500 will respond to the weights of occupants 110. By turning the switches ON and OFF on time, computer 500 will timely speed up the immediate responses when a collision is sensed. Computer 500 comprises a control means that uses logical functions to timely opens and closes all circuits for the switches. The logic depend on the switches to open and close on time, allowing the computer 500 to know who the occupant is by the weight value, before activating the airbag assembly 400 for air bag 1, 2, which is configured to deploy with a force corresponding to a controlled energy value that is directly related to the weight of occupant 110. The weights are promptly transmitted to influence the control of energy that will enforce deployments that are totally dependant on the occupants 110 weight value. The switches are activated when the collision sensor 75 senses collision. The arrangement of the electronically conducting line signals for the entire circuits are being used for signaling the RAM 32, the computer 500, and the CPU 26 to initiate the controlled deployment of the air bag 1, 2.

| A1:A501 | | |
|---|---|---|
| WEIGHT IN DECIMALS | WEIGHT IN BINARIES "off & on switches" | SPEED "minimum speed for deployment" |
| 1 | 1 | 13 MPH |
| 2 | 10 | 13 MPH |
| 3 | 11 | 13 MPH |
| 4 | 100 | 13 MPH |
| 5 | 101 | 13 MPH |
| 6 | 110 | 13 MPH |
| 7 | 111 | 13 MPH |
| 8 | 1000 | 13 MPH |
| 9 | 1001 | 13 MPH |
| 10 | 1010 | 13 MPH |
| 11 | 1011 | 13 MPH |
| 12 | 1100 | 13 MPH |
| 13 | 1101 | 13 MPH |
| 14 | 1110 | 13 MPH |
| 15 | 1111 | 13 MPH |
| 16 | 10000 | 13 MPH |
| 17 | 10001 | 13 MPH |
| 18 | 10010 | 13 MPH |
| 19 | 10011 | 13 MPH |
| 20 | 10100 | 13 MPH |
| 21 | 10101 | 13 MPH |
| 22 | 10110 | 13 MPH |
| 23 | 10111 | 13 MPH |
| 24 | 11000 | 13 MPH |
| 25 | 11001 | 13 MPH |
| 26 | 11010 | 13 MPH |
| 27 | 11011 | 13 MPH |
| 28 | 11100 | 13 MPH |
| 29 | 11101 | 13 MPH |
| 30 | 11110 | 13 MPH |
| 31 | 11111 | 13 MPH |
| 32 | 100000 | 13 MPH |
| 33 | 100001 | 13 MPH |
| 34 | 100010 | 13 MPH |
| 35 | 100011 | 13 MPH |
| 36 | 100100 | 13 MPH |
| 37 | 100101 | 13 MPH |
| 38 | 100110 | 13 MPH |
| 39 | 100111 | 13 MPH |
| 40 | 101000 | 13 MPH |
| 41 | 101001 | 13 MPH |
| 42 | 101010 | 13 MPH |
| 43 | 101011 | 13 MPH |
| 44 | 101100 | 13 MPH |
| 45 | 101101 | 13 MPH |
| 46 | 101110 | 13 MPH |
| 47 | 101111 | 13 MPH |
| 48 | 110000 | 13 MPH |
| 49 | 110001 | 13 MPH |
| 50 | 110010 | 13 MPH |
| 51 | 110011 | 13 MPH |
| 52 | 110100 | 13 MPH |
| 53 | 110101 | 13 MPH |
| 54 | 110110 | 13 MPH |
| 55 | 110111 | 13 MPH |
| 56 | 111000 | 13 MPH |
| 57 | 111001 | 13 MPH |
| 58 | 111010 | 13 MPH |
| 59 | 111011 | 13 MPH |
| 60 | 111100 | 13 MPH |
| 61 | 111101 | 13 MPH |
| 62 | 111110 | 13 MPH |
| 63 | 111111 | 13 MPH |
| 64 | 1000000 | 13 MPH |
| 65 | 1000001 | 13 MPH |
| 66 | 1000010 | 13 MPH |
| 67 | 1000011 | 13 MPH |
| 68 | 1000100 | 13 MPH |
| 69 | 1000101 | 13 MPH |
| 70 | 1000110 | 13 MPH |
| 71 | 1000111 | 13 MPH |
| 72 | 1001000 | 13 MPH |
| 73 | 1001001 | 13 MPH |
| 74 | 1001010 | 13 MPH |
| 75 | 1001011 | 13 MPH |
| 76 | 1001100 | 13 MPH |
| 77 | 1001101 | 13 MPH |
| 78 | 1001110 | 13 MPH |
| 79 | 1001111 | 13 MPH |
| 80 | 1010000 | 13 MPH |
| 81 | 1010001 | 13 MPH |
| 82 | 1010010 | 13 MPH |
| 83 | 1010011 | 13 MPH |
| 84 | 1010100 | 13 MPH |
| 85 | 1010101 | 13 MPH |
| 86 | 1010110 | 13 MPH |
| 87 | 1010111 | 13 MPH |
| 88 | 1011000 | 13 MPH |
| 89 | 1011001 | 13 MPH |
| 90 | 1011010 | 13 MPH |
| 91 | 1011011 | 13 MPH |
| 92 | 1011100 | 13 MPH |
| 93 | 1011101 | 13 MPH |
| 94 | 1011110 | 13 MPH |
| 95 | 1011111 | 13 MPH |
| 96 | 1100000 | 13 MPH |
| 97 | 1100001 | 13 MPH |
| 98 | 1100010 | 13 MPH |
| 99 | 1100011 | 13 MPH |
| 100 | 1100100 | 13 MPH |
| 101 | 1100101 | 13 MPH |
| 102 | 1100110 | 13 MPH |
| 103 | 1100111 | 13 MPH |
| 104 | 1101000 | 13 MPH |
| 105 | 1101001 | 13 MPH |
| 106 | 1101010 | 13 MPH |
| 107 | 1101011 | 13 MPH |

A1:A501

| WEIGHT IN DECIMALS | WEIGHT IN BINARIES "off & on switches" | SPEED "minimum speed for deployment" |
|---|---|---|
| 108 | 1101100 | 13 MPH |
| 109 | 1101101 | 13 MPH |
| 110 | 1101110 | 13 MPH |
| 111 | 1101111 | 13 MPH |
| 112 | 1110000 | 13 MPH |
| 113 | 1110001 | 13 MPH |
| 114 | 1110010 | 13 MPH |
| 115 | 1110011 | 13 MPH |
| 116 | 1110100 | 13 MPH |
| 117 | 1110101 | 13 MPH |
| 118 | 1110110 | 13 MPH |
| 119 | 1110111 | 13 MPH |
| 120 | 1111000 | 13 MPH |
| 121 | 1111001 | 13 MPH |
| 122 | 1111010 | 13 MPH |
| 123 | 1111011 | 13 MPH |
| 124 | 1111100 | 13 MPH |
| 125 | 1111101 | 13 MPH |
| 126 | 1111110 | 13 MPH |
| 127 | 1111111 | 13 MPH |
| 128 | 10000000 | 13 MPH |
| 129 | 10000001 | 13 MPH |
| 130 | 10000010 | 13 MPH |
| 131 | 10000011 | 13 MPH |
| 132 | 10000100 | 13 MPH |
| 133 | 10000101 | 13 MPH |
| 134 | 10000110 | 13 MPH |
| 135 | 10000111 | 13 MPH |
| 136 | 10001000 | 13 MPH |
| 137 | 10001001 | 13 MPH |
| 138 | 10001010 | 13 MPH |
| 139 | 10001011 | 13 MPH |
| 140 | 10001100 | 13 MPH |
| 141 | 10001101 | 13 MPH |
| 142 | 10001110 | 13 MPH |
| 143 | 10001111 | 13 MPH |
| 144 | 10010000 | 13 MPH |
| 145 | 10010001 | 13 MPH |
| 146 | 10010010 | 13 MPH |
| 147 | 10010011 | 13 MPH |
| 148 | 10010100 | 13 MPH |
| 149 | 10010101 | 13 MPH |
| 150 | 10010110 | 13 MPH |
| 151 | 10010111 | 13 MPH |
| 152 | 10011000 | 13 MPH |
| 153 | 10011001 | 13 MPH |
| 154 | 10011010 | 13 MPH |
| 155 | 10011011 | 13 MPH |
| 156 | 10011100 | 13 MPH |
| 157 | 10011101 | 13 MPH |
| 158 | 10011110 | 13 MPH |
| 159 | 10011111 | 13 MPH |
| 160 | 10100000 | 13 MPH |
| 161 | 10100001 | 13 MPH |
| 162 | 10100010 | 13 MPH |
| 163 | 10100011 | 13 MPH |
| 164 | 10100100 | 13 MPH |
| 165 | 10100101 | 13 MPH |
| 166 | 10100110 | 13 MPH |
| 167 | 10100111 | 13 MPH |
| 168 | 10101000 | 13 MPH |
| 169 | 10101001 | 13 MPH |
| 170 | 10101010 | 13 MPH |
| 171 | 10101011 | 13 MPH |
| 172 | 10101100 | 13 MPH |
| 173 | 10101101 | 13 MPH |
| 174 | 10101110 | 13 MPH |
| 175 | 10101111 | 13 MPH |
| 176 | 10110000 | 13 MPH |
| 177 | 10110001 | 13 MPH |
| 178 | 10110010 | 13 MPH |
| 179 | 10110011 | 13 MPH |
| 180 | 10110100 | 13 MPH |
| 181 | 10110101 | 13 MPH |
| 182 | 10110110 | 13 MPH |
| 183 | 10110111 | 13 MPH |
| 184 | 10111000 | 13 MPH |
| 185 | 10111001 | 13 MPH |
| 186 | 10111010 | 13 MPH |
| 187 | 10111011 | 13 MPH |
| 188 | 10111100 | 13 MPH |
| 189 | 10111101 | 13 MPH |
| 190 | 10111110 | 13 MPH |
| 191 | 10111111 | 13 MPH |
| 192 | 11000000 | 13 MPH |
| 193 | 11000001 | 13 MPH |
| 194 | 11000010 | 13 MPH |
| 195 | 11000011 | 13 MPH |
| 196 | 11000100 | 13 MPH |
| 197 | 11000101 | 13 MPH |
| 198 | 11000110 | 13 MPH |
| 199 | 11000111 | 13 MPH |
| 200 | 11001000 | 13 MPH |
| 201 | 11001001 | 13 MPH |
| 202 | 11001010 | 13 MPH |
| 203 | 11001011 | 13 MPH |
| 204 | 11001100 | 13 MPH |
| 205 | 11001101 | 13 MPH |
| 206 | 11001110 | 13 MPH |
| 207 | 11001111 | 13 MPH |
| 208 | 11010000 | 13 MPH |
| 209 | 11010001 | 13 MPH |
| 210 | 11010010 | 13 MPH |
| 211 | 11010011 | 13 MPH |
| 212 | 11010100 | 13 MPH |
| 213 | 11010101 | 13 MPH |
| 214 | 11010110 | 13 MPH |
| 215 | 11010111 | 13 MPH |
| 216 | 11011000 | 13 MPH |
| 217 | 11011001 | 13 MPH |
| 218 | 11011010 | 13 MPH |
| 219 | 11011011 | 13 MPH |
| 220 | 11011100 | 13 MPH |
| 221 | 11011101 | 13 MPH |
| 222 | 11011110 | 13 MPH |
| 223 | 11011111 | 13 MPH |
| 224 | 11100000 | 13 MPH |
| 225 | 11100001 | 13 MPH |
| 226 | 11100010 | 13 MPH |
| 227 | 11100011 | 13 MPH |
| 228 | 11100100 | 13 MPH |
| 229 | 11100101 | 13 MPH |
| 230 | 11100110 | 13 MPH |
| 231 | 11100111 | 13 MPH |
| 232 | 11101000 | 13 MPH |
| 233 | 11101001 | 13 MPH |
| 234 | 11101010 | 13 MPH |
| 235 | 11101011 | 13 MPH |
| 236 | 11101100 | 13 MPH |
| 237 | 11101101 | 13 MPH |
| 238 | 11101110 | 13 MPH |
| 239 | 11101111 | 13 MPH |
| 240 | 11110000 | 13 MPH |
| 241 | 11110001 | 13 MPH |
| 242 | 11110010 | 13 MPH |
| 243 | 11110011 | 13 MPH |
| 244 | 11110100 | 13 MPH |
| 245 | 11110101 | 13 MPH |
| 246 | 11110110 | 13 MPH |
| 247 | 11110111 | 13 MPH |
| 248 | 11111000 | 13 MPH |
| 249 | 11111001 | 13 MPH |
| 250 | 11111010 | 13 MPH |
| 251 | 11111011 | 13 MPH |
| 252 | 11111100 | 13 MPH |
| 253 | 11111101 | 13 MPH |
| 254 | 11111110 | 13 MPH |
| 255 | 11111111 | 13 MPH |
| 256 | 100000000 | 13 MPH |
| 257 | 100000001 | 13 MPH |

-continued

A1:A501

| WEIGHT IN DECIMALS | WEIGHT IN BINARIES "off & on switches" | SPEED "minimum speed for deployment" |
|---|---|---|
| 258 | 100000010 | 13 MPH |
| 259 | 100000011 | 13 MPH |
| 260 | 100000100 | 13 MPH |
| 261 | 100000101 | 13 MPH |
| 262 | 100000110 | 13 MPH |
| 263 | 100000111 | 13 MPH |
| 264 | 100001000 | 13 MPH |
| 265 | 100001001 | 13 MPH |
| 266 | 100001010 | 13 MPH |
| 267 | 100001011 | 13 MPH |
| 268 | 100001100 | 13 MPH |
| 269 | 100001101 | 13 MPH |
| 270 | 100001110 | 13 MPH |
| 271 | 100001111 | 13 MPH |
| 272 | 100010000 | 13 MPH |
| 273 | 100010001 | 13 MPH |
| 274 | 100010010 | 13 MPH |
| 275 | 100010011 | 13 MPH |
| 276 | 100010100 | 13 MPH |
| 277 | 100010101 | 13 MPH |
| 278 | 100010110 | 13 MPH |
| 279 | 100010111 | 13 MPH |
| 280 | 100011000 | 13 MPH |
| 281 | 100011001 | 13 MPH |
| 282 | 100011010 | 13 MPH |
| 283 | 100011011 | 13 MPH |
| 284 | 100011100 | 13 MPH |
| 285 | 100011101 | 13 MPH |
| 286 | 100011110 | 13 MPH |
| 287 | 100011111 | 13 MPH |
| 288 | 100100000 | 13 MPH |
| 289 | 100100001 | 13 MPH |
| 290 | 100100010 | 13 MPH |
| 291 | 100100011 | 13 MPH |
| 292 | 100100100 | 13 MPH |
| 293 | 100100101 | 13 MPH |
| 294 | 100100110 | 13 MPH |
| 295 | 100100111 | 13 MPH |
| 296 | 100101000 | 13 MPH |
| 297 | 100101001 | 13 MPH |
| 298 | 100101010 | 13 MPH |
| 299 | 100101011 | 13 MPH |
| 300 | 100101100 | 13 MPH |
| 301 | 100101101 | 13 MPH |
| 302 | 100101110 | 13 MPH |
| 303 | 100101111 | 13 MPH |
| 304 | 100110000 | 13 MPH |
| 305 | 100110001 | 13 MPH |
| 306 | 100110010 | 13 MPH |
| 307 | 100110011 | 13 MPH |
| 308 | 100110100 | 13 MPH |
| 309 | 100110101 | 13 MPH |
| 310 | 100110110 | 13 MPH |
| 311 | 100110111 | 13 MPH |
| 312 | 100111000 | 13 MPH |
| 313 | 100111001 | 13 MPH |
| 314 | 100111010 | 13 MPH |
| 315 | 100111011 | 13 MPH |
| 316 | 100111100 | 13 MPH |
| 317 | 100111101 | 13 MPH |
| 318 | 100111110 | 13 MPH |
| 319 | 100111111 | 13 MPH |
| 320 | 101000000 | 13 MPH |
| 321 | 101000001 | 13 MPH |
| 322 | 101000010 | 13 MPH |
| 323 | 101000011 | 13 MPH |
| 324 | 101000100 | 13 MPH |
| 325 | 101000101 | 13 MPH |
| 326 | 101000110 | 13 MPH |
| 327 | 101000111 | 13 MPH |
| 328 | 101001000 | 13 MPH |
| 329 | 101001001 | 13 MPH |
| 330 | 101001010 | 13 MPH |
| 331 | 101001011 | 13 MPH |
| 332 | 101001100 | 13 MPH |
| 333 | 101001101 | 13 MPH |
| 334 | 101001110 | 13 MPH |
| 335 | 101001111 | 13 MPH |
| 336 | 101010000 | 13 MPH |
| 337 | 101010001 | 13 MPH |
| 338 | 101010010 | 13 MPH |
| 339 | 101010011 | 13 MPH |
| 340 | 101010100 | 13 MPH |
| 341 | 101010101 | 13 MPH |
| 342 | 101010110 | 13 MPH |
| 343 | 101010111 | 13 MPH |
| 344 | 101011000 | 13 MPH |
| 345 | 101011001 | 13 MPH |
| 346 | 101011010 | 13 MPH |
| 347 | 101011011 | 13 MPH |
| 348 | 101011100 | 13 MPH |
| 349 | 101011101 | 13 MPH |
| 350 | 101011110 | 13 MPH |
| 351 | 101011111 | 13 MPH |
| 352 | 101100000 | 13 MPH |
| 353 | 101100001 | 13 MPH |
| 354 | 101100010 | 13 MPH |
| 355 | 101100011 | 13 MPH |
| 356 | 101100100 | 13 MPH |
| 357 | 101100101 | 13 MPH |
| 358 | 101100110 | 13 MPH |
| 359 | 101100111 | 13 MPH |
| 360 | 101101000 | 13 MPH |
| 361 | 101101001 | 13 MPH |
| 362 | 101101010 | 13 MPH |
| 363 | 101101011 | 13 MPH |
| 364 | 101101100 | 13 MPH |
| 365 | 101101101 | 13 MPH |
| 366 | 101101110 | 13 MPH |
| 367 | 101101111 | 13 MPH |
| 368 | 101110000 | 13 MPH |
| 369 | 101110001 | 13 MPH |
| 370 | 101110010 | 13 MPH |
| 371 | 101110011 | 13 MPH |
| 372 | 101110100 | 13 MPH |
| 373 | 101110101 | 13 MPH |
| 374 | 101110110 | 13 MPH |
| 375 | 101110111 | 13 MPH |
| 376 | 101111000 | 13 MPH |
| 377 | 101111001 | 13 MPH |
| 378 | 101111010 | 13 MPH |
| 379 | 101111011 | 13 MPH |
| 380 | 101111100 | 13 MPH |
| 381 | 101111101 | 13 MPH |
| 382 | 101111110 | 13 MPH |
| 383 | 101111111 | 13 MPH |
| 384 | 110000000 | 13 MPH |
| 385 | 110000001 | 13 MPH |
| 386 | 110000010 | 13 MPH |
| 387 | 110000011 | 13 MPH |
| 388 | 110000100 | 13 MPH |
| 389 | 110000101 | 13 MPH |
| 390 | 110000110 | 13 MPH |
| 391 | 110000111 | 13 MPH |
| 392 | 110001000 | 13 MPH |
| 393 | 110001001 | 13 MPH |
| 394 | 110001010 | 13 MPH |
| 395 | 110001011 | 13 MPH |
| 396 | 110001100 | 13 MPH |
| 397 | 110001101 | 13 MPH |
| 398 | 110001110 | 13 MPH |
| 399 | 110001111 | 13 MPH |
| 400 | 110010000 | 13 MPH |
| 401 | 110010001 | 13 MPH |
| 402 | 110010010 | 13 MPH |
| 403 | 110010011 | 13 MPH |
| 404 | 110010100 | 13 MPH |
| 405 | 110010101 | 13 MPH |
| 406 | 110010110 | 13 MPH |
| 407 | 110010111 | 13 MPH |

-continued

A1:A501

| WEIGHT IN DECIMALS | WEIGHT IN BINARIES "off & on switches" | SPEED "minimum speed for deployment" |
|---|---|---|
| 408 | 110011000 | 13 MPH |
| 409 | 110011001 | 13 MPH |
| 410 | 110011010 | 13 MPH |
| 411 | 110011011 | 13 MPH |
| 412 | 110011100 | 13 MPH |
| 413 | 110011101 | 13 MPH |
| 414 | 110011110 | 13 MPH |
| 415 | 110011111 | 13 MPH |
| 416 | 110100000 | 13 MPH |
| 417 | 110100001 | 13 MPH |
| 418 | 110100010 | 13 MPH |
| 419 | 110100011 | 13 MPH |
| 420 | 110100100 | 13 MPH |
| 421 | 110100101 | 13 MPH |
| 422 | 110100110 | 13 MPH |
| 423 | 110100111 | 13 MPH |
| 424 | 110101000 | 13 MPH |
| 425 | 110101001 | 13 MPH |
| 426 | 110101010 | 13 MPH |
| 427 | 110101011 | 13 MPH |
| 428 | 110101100 | 13 MPH |
| 429 | 110101101 | 13 MPH |
| 430 | 110101110 | 13 MPH |
| 431 | 110101111 | 13 MPH |
| 432 | 110110000 | 13 MPH |
| 433 | 110110001 | 13 MPH |
| 434 | 110110010 | 13 MPH |
| 435 | 110110011 | 13 MPH |
| 436 | 110110100 | 13 MPH |
| 437 | 110110101 | 13 MPH |
| 438 | 110110110 | 13 MPH |
| 439 | 110110111 | 13 MPH |
| 440 | 110111000 | 13 MPH |
| 441 | 110111001 | 13 MPH |
| 442 | 111000100 | 13 MPH |
| 443 | 110111011 | 13 MPH |
| 444 | 110111100 | 13 MPH |
| 445 | 110111101 | 13 MPH |
| 446 | 110111110 | 13 MPH |
| 447 | 110111111 | 13 MPH |
| 448 | 111000000 | 13 MPH |
| 449 | 111000001 | 13 MPH |
| 450 | 111000010 | 13 MPH |
| 451 | 111000011 | 13 MPH |
| 452 | 111000100 | 13 MPH |
| 453 | 111000101 | 13 MPH |
| 454 | 111000110 | 13 MPH |
| 455 | 111000111 | 13 MPH |
| 456 | 111001000 | 13 MPH |
| 457 | 111001001 | 13 MPH |
| 458 | 111001010 | 13 MPH |
| 459 | 111001011 | 13 MPH |
| 460 | 111001100 | 13 MPH |

In deciding the speed at which the computer logic should respond to the occupants 110 weight value during collision, the decimal digital readings are transformed into binaries. The electronic switches recognize the binaries as OFF and ON switches that represents "1s" and "0s". Where the 0s represents OFF signals and the is represents ON signals. The OFF is an opened circuit and the ON is a closed circuit. The above configuration are the weight values in decimals and binaries representation of the OFF and ON electronics witching system being logically operable for communication with computer 500, further comprising communicating the number of switches that would need to be turn ON or OFF to influence accurate responses to the weight signals, and effectively energizing the active devices that will initiate a control energy being communicatively operable for providing the deployment force for airbag 1, 2. to be deployed without causing any further injury to occupant 110.

The above weight sizes shows how fast it will take the computer 500 to timely respond to the weights of the occupants 110 by turning the switches ON and OFF on time, providing immediate response when a collision is sensed. The computer 500 uses logic functions to timely open and close all circuits. The logic depends on the switches to open and close on time, providing communication signals responsive to the weight values of occupant 110, and activate the airbag assembly 400 for airbags 1, 2. The weight values are promptly transmitted to influence the controlled energy that enforces deployment force.

It is now understood that disclosed embodiment is not limited to the sole described above, but encompasses any and all embodiment within the scope of the following claims:

What is claimed:

1. A vehicle occupant detection means and weight responsive classification system for controlling the resistance era restraint device, such that in an accident, an occupant of the vehicle impacts the restraint device without injury; comprising:
   a. at least a supplemental restraint device comprising at least a seatbelt device and at least an airbag device configured with at least a combustion chamber;
   b. at least a seat disposed with a seat mounting structure affixed on at least a floor means;
   c. at least a pressure sensing device comprising at least one weight sensor each secured beneath said at least one seat configured to measure the weight value of at least a vehicle occupant;
   d. a computer apparatus, in signal communication with said pressure sensing device;
   e. a collision force sensor in communication with said computer apparatus;
   f. said computer apparatus responsive to said pressure sensing device for controlling at least an airbag tension for said at least one airbag device, wherein the airbag is rendered of sufficient deployment force to keep the occupant on a seat when a collision is sensed, but is not rendered of sufficient deployment force to cause impact injury to the occupant;
   g. at least one human body temperature sensor in association with said pressure sensing device; and,
   h. a manually operable check button for testing airbag components resulting in an audio read out of test results.

2. The vehicle seat occupant detection means and weight responsive classification system of claim 1, wherein said pressure sensing device comprises at least a load cell.

3. The vehicle seat occupant detection means and weight responsive classification system of claim 1, wherein said pressure sensing device further configured with at least a strain gauge communicatively connected to said computer apparatus, said computer apparatus further operable for adjusting the deployment force and speed of said air bag device based on at least a measured parameter; comprising: at least one, or a combination of, said occupant's weight, a vehicle speed, and/or a collision force value.

4. The vehicle seat occupant detection means and weight responsive classification system of claim 1, wherein each said at least one seat being configured with said at least one pressure sensing device, and wherein at least a vehicle speed sensor and/or said at least one restraint device is provided each configured with said at least one pressure sensing device.

5. The vehicle seat occupant detection means and weight responsive classification system of claim 1, wherein said at least one collision sensor further comprising at least a proximity sensor being operable for detecting imminent frontal and/or rear-end collision.

6. The vehicle seat occupant detection means and weight responsive classification system of claim 1, wherein said airbag device further comprises at least a dual airbag comprising a first surface configured with at least an inner inflatable layer, a second surface configured with at least an outer inflatable layer, wherein said-surfaces comprise at least a cushioning layer there-between.

7. The vehicle seat occupant detection means and weight responsive classification system of claim 1, wherein said computer apparatus further operable for calculating a deployment force value based upon the weight value of the occupant and/or a collision force value according to the vehicle speed.

8. The vehicle seat occupant detection means and weight responsive classification system of claim 1, further comprising at least one human body temperature sensor each being associated with said at least one weight sensor, said temperature sensor being operable for distinguishing at least human occupants from other objects on said seat.

9. The vehicle seat occupant detection means and weight responsive classification system of claim 1, wherein said computer apparatus thither responsive to said seat deformation caused by human body weight.

10. The vehicle seat occupant detection means and weight responsive classification system of claim 1, wherein said collision sensor further configured to provide signal communications, said computer apparatus responsive to said signal communications and activating said restraint device when said collision severity exceeds a threshold limit.

11. The vehicle seat occupant detection means and weight responsive classification system of claim 1, wherein said computer apparatus further comprises at least a memory device.

12. The vehicle seat occupant detection means and weight responsive classification system of claim 11, wherein said memory device further comprises at least an EPROM device in association with an address line for correcting occupants weight data based on external conditions and/or at least a changing occupant.

13. A vehicle seat occupant detection means and weight responsive classification system for controlling the resistance of a restraint device, such that in an accident, an occupant of the vehicle impacts the restraint device without injury, comprising:
   a. at least a supplemental restraint device comprising at least an airbag device comprising at least a combustion chamber and a seatbelt device;
   b. at least a seat disposed with a seat mounting structure affixed on at least a floor means;
   c. a pressure sensing device comprising at least one weight sensor each secured between said seat mounting structure and said floor means;
   d. a computer apparatus responsive to signal from said pressure sensing device for controlling at least an airbag tension for said at least one airbag device, said computer apparatus calculating a deployment force value based upon at least a weight value of at least a sitting occupant and/or at least a collision force value;
   e. a collision force sensor communicatively configured with said airbag device and operatively configured with said computer apparatus;
   f. at least one human body temperature sensor in association with said at least one pressure sensing device; and,
   g. a manually operable check button for testing airbag components resulting in an audio read out of test results.

14. The vehicle seat occupant detection means and weight responsive classification system of claim 13, further comprising means for correcting the measured weight value of a sitting occupant when said weight value is influenced by at least an external force.

15. The vehicle seat occupant detection means and weight responsive classification system of claim 13, wherein said pressure sensing device further comprising at least a load cell(,) disposed with at least a strain gauge, and at least (a) the temperature sensor, and wherein said load cell is further disposed between said seat mounting structure and said floor means for distinguishing human bodies from other objects.

16. The vehicle seat occupant detection means and weight responsive classification system of claim 13, wherein said supplemental restraint device thither comprises at least one seatbelt sensor disposed on a seatbelt corresponding to at least one seat, said seatbelt sensor operatively configured with said computer apparatus, and said supplemental restraint device further comprises at least one corresponding airbag sensor disposed with said airbag device, said airbag device comprising at least an airbag configured with at least one canister of igniting gas being operable with said computer apparatus, wherein said seatbelt sensor and said airbag sensor communicatively configured to direct deployment of said airbag device away from at least an occupant's head.

17. The vehicle seat occupant detection means and weight responsive classification system of claim 13, wherein said airbag device further comprising at least a multistage airbag comprising at least a dual layer comprising at least a first surface, and at least a second surface being operable for providing extra cushioning there-between upon contact with at least an occupant during deployment.

18. The vehicle seat occupant detection means and weight responsive classification system of claim 13, wherein said computer apparatus further operatively configured for characterizing input/output signals responsive to at least one signal from said pressure sensing device, said signal corresponding to at least one measured weight value for at least one occupant, said airbag device responsive to said input/output signals, further comprising at least a processor operable with at least one of: said collision sensor, at least an accelerometer.

19. The vehicle seat occupant detection means and weight responsive classification system of claim 13, further comprising a plurality of seats each configured with at least one weight sensor, at least a vehicle speed sensor is communicatively connected to said computer apparatus, at least a restraint device is being provided with each of the plurality seats, and wherein said weight sensor and/or said speed sensor being operatively configured with said collision sensor, at least said airbag device being responsive to a collision force signal for deployment of said restraint device proportionately when said collision severity exceeds a threshold limit.

20. The vehicle seat occupant detection means and weight responsive classification system of claim 13, wherein said collision sensor further comprising at least a proximity sensor being operable for detecting imminent frontal and/or rear-end collision.

21. The vehicle seat occupant detection means and weight responsive classification system of claim 13, wherein said airbag device further comprises at least a dual airbag comprising at least an inner inflatable layer being configured with at least an outer inflatable layer, wherein said layers further comprising a cushioning surface there between.

22. The vehicle seat occupant detection means and weight responsive classification system of claim 13, wherein said computer apparatus further comprising at least a memory device comprising a data line configured for each seat and communicatively connected to said pressure sensing device.

23. The vehicle seat occupant detection means and weight responsive classification system of claim 22, wherein said memory device further comprises an erasable programmable read only memory 'EPROM' operable for controlling data about a changing occupant.

24. The vehicle seat occupant detection means and weight responsive classification system of claim 13, wherein said pressure sensing device in communication with said computer apparatus, and wherein said computer apparatus in association with at least the restraint device, wherein said computer apparatus calculating a mass value for adjusting at least the air bag deployment speed/force if the occupant does not have the seatbelt device locked.

25. The vehicle seat occupant detection means and weight responsive classification system of claim 24, wherein said computer apparatus further electrically connected to said memory device for storing said mass value and for controlling said airbag deployment force.

26. The vehicle seat occupant detection means and weight responsive classification system of claim 13, wherein said airbag device further comprises at least a gas canister having at least a vent aperture outlet through which igniting gas flows from the combustion chamber to the ambient atmosphere.

27. The vehicle seat occupant detection means and weight responsive classification system of claim 26, wherein said gas canister further connected to said computer apparatus for initiating at least a variable deployment force and acceleration for said airbag device.

28. The vehicle seat occupant detection means and weight responsive classification system of claim 13, wherein said computer apparatus further comprises at least a driver operable for driving at least an erasable programmable read only memory "EPROM" device.

29. The vehicle seat occupant detection means and weight responsive classification system of claim 28, wherein said EPROM device in communication with at least a random access memory being operable with a software program configured for accessing said weight measurements.

30. A vehicle occupant detection means and weight responsive system for controlling the resistance of a restraint device, such that in an accident, an occupant of a vehicle impacts the device without injury, comprising:
   at least a restraint device;
   at least a seat disposed with at least a seat mounting structure;
   a weight sensing apparatus operatively secured beneath said at least one seat mounting structure and at least a floor means for a vehicle;
   a computer apparatus communicatively connecting said weight sensing apparatus to said restraint device, said restraint device comprising at least one airbag system each having at least one airbag;
   at least one human body temperature sensor in association with said at least one weight sensing apparatus; and,
   a manually operable check button for testing airbag components resulting in an audio read out of test results.

31. The vehicle seat occupant detection means and weight responsive classification system of claim 30, wherein said computer apparatus further comprising at least one memory device.

32. The vehicle seat occupant detection means and weight responsive classification system of claim 30, wherein said at least one human body temperature sensor in association with said at least one weight sensor, further comprising at least an infrared sensor.

33. The vehicle seat occupant detection means and weight responsive classification system of claim 30, wherein said computer apparatus in communication with said pressure sensing device for identifying at least one threshold value.

34. The vehicle seat occupant detection means and weight responsive classification system of claim 30, wherein said pressure sensing device further comprises at least a load cell being operatively configured with a strain gauge responsive to occupant's weight.

35. The vehicle seat occupant detection means and weight responsive classification system of claim 30, wherein said weight sensing apparatus further comprising means for detecting occurring resistance signals and generating corresponding electrical signals, said electrical signals being communicated to said computer apparatus.

36. The vehicle seat occupant detection means and weight responsive classification system of claim 30, wherein said computer apparatus further operable for calculating the operating weight value corresponding to said weight measurements for each occupied seat, and communicating said operating weight value to said restraint device corresponding to said seat.

37. The vehicle seat occupant detection means and weight responsive classification system of claim 30, wherein said computer apparatus being operatively configured for receiving the operating weight value for said seat and for adjusting said airbag device associated with said seat to deploy with a deployment force and acceleration value that are proportionate to the weight value of the sitting occupant.

38. The vehicle seat occupant detection means and classification system of claim 30, wherein said weight sensing apparatus comprises a load cell.

39. The vehicle seat occupant detection means and classification system of claim 38, wherein said load cell further comprises at least one strain gauge each comprising electrical resistance elements operable to sense a force and measure at least resistance occurring when external strain is applied to said seat.

* * * * *